United States Patent
Xu et al.

(10) Patent No.: US 12,063,153 B2
(45) Date of Patent: Aug. 13, 2024

(54) METHOD AND APPARATUS FOR IMPLEMENTING MULTICAST

(71) Applicant: Huawei Technologies Co., Ltd., Shenzhen (CN)

(72) Inventors: Guoqi Xu, Beijing (CN); Naiwen Wei, Beijing (CN); Yisong Liu, Shenzhen (CN); Hao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 17/541,465

(22) Filed: Dec. 3, 2021

(65) Prior Publication Data

US 2022/0094626 A1    Mar. 24, 2022

Related U.S. Application Data

(63) Continuation of application No. PCT/CN2020/090725, filed on May 17, 2020.

(30) Foreign Application Priority Data

Jun. 6, 2019 (CN) .......................... 201910492933.X

(51) Int. Cl.
*H04L 45/16* (2022.01)
*H04L 9/40* (2022.01)
(Continued)

(52) U.S. Cl.
CPC .............. *H04L 45/16* (2013.01); *H04L 12/18* (2013.01); *H04L 45/02* (2013.01); *H04L 45/22* (2013.01); *H04L 63/0272* (2013.01)

(58) Field of Classification Search
None
See application file for complete search history.

(56) References Cited

U.S. PATENT DOCUMENTS 9,832,031 B2    11/2017    Zhao et al.
9,935,816 B1    4/2018    Chen et al.
(Continued)

FOREIGN PATENT DOCUMENTS

CN    104702480 A    6/2015
CN    105337865 A    2/2016
(Continued)

OTHER PUBLICATIONS

V. Joseph, S. Mulugu, Network Convergence, pp. 73-323, (Year: 2013).*

(Continued)

*Primary Examiner* — Christopher M Crutchfield
(74) *Attorney, Agent, or Firm* — Conley Rose, P.C.

(57) ABSTRACT

A method and apparatus for implementing multicast. When a multicast source performs route advertisement, route update is performed on a cross-DC integrated device, and a received device identifier and a received AS number are replaced with a device identifier and an AS number that are of the integrated device. In this way, when a multicast user joins the multicast source, each network device in the network can trace the multicast source based on a received route, and determine a multicast path that is from the multicast source to the multicast user. Therefore, it is possible to accurately perform, in a NG MVPN, cross-DC multicast on traffic of the multicast source.

20 Claims, 10 Drawing Sheets

(51) Int. Cl.
  *H04L 12/18*   (2006.01)
  *H04L 45/00*   (2022.01)
  *H04L 45/02*   (2022.01)

(56) References Cited

U.S. PATENT DOCUMENTS

| | | | |
|---|---|---|---|
| 2006/0088031 A1* | 4/2006 | Nalawade | H04L 12/4641 370/428 |
| 2014/0169366 A1* | 6/2014 | Kotalwar | H04L 45/16 370/390 |
| 2015/0003450 A1 | 1/2015 | Salam et al. | |
| 2016/0134535 A1 | 5/2016 | Callon | |
| 2016/0277463 A1 | 9/2016 | Nagarajan et al. | |
| 2017/0289217 A1* | 10/2017 | Kebler | H04L 65/611 |
| 2018/0176121 A1 | 6/2018 | Jayaraman et al. | |
| 2018/0287946 A1 | 10/2018 | Nagarajan et al. | |
| 2018/0359323 A1 | 12/2018 | Madden | |
| 2020/0336334 A1* | 10/2020 | He | H04L 41/0816 |

FOREIGN PATENT DOCUMENTS

| | | |
|---|---|---|
| CN | 105743797 A | 7/2016 |
| CN | 105991302 A | 10/2016 |
| CN | 106161258 A | 11/2016 |
| CN | 108206785 A | 6/2018 |
| CN | 108696440 A | 10/2018 |
| CN | 109218178 A | 1/2019 |
| EP | 3013006 A1 | 4/2016 |

OTHER PUBLICATIONS

Arggrwal, E. Rosen, T. Morin, Y. Rekhter, BGP Encodings and Procedures for Multicast in MPLS/BGP IP VPNs, pp. 1-59, Feb. 2012.*
A. Arggrwal, E. Rosen, T. Morin, Y. Rekhter, Multicast in MPLS/BGP IP VPNs, pp. 1-88, Feb. 2012.*
Author Unknown, IP Multicast: MVPN Configuration Guide, pp. 1-339, May 10, 2017.*
Uthor Unknown, MVPN/EVPN C-Multicast Routes Enhancements, pp. 1-36, Jul. 8, 2016.*
Heydari, V., et al., "Secure VPN Using Mobile IPv6 Based Moving Target Defense," IEEE Global Communications Conference (Globecom), 2016, 6 pages.
E. Rosen, Ed., et al., "Multicast in MPLS/BGP IP VPNs," RFC 6513, XP015081439, Feb. 2012, 88 pages.
R. Aggarwal, et al., "BGP Encodings and Procedures for Multicast in MPLS/BGP IP VPNs," RFC 6514, Feb. 2012, 59 pages.
A. Sajassi, Ed., et al., "BGP MPLS-Based Ethernet VPN," RFC 7432, Feb. 2015, 56 pages.

* cited by examiner

METHOD AND APPARATUS FOR IMPLEMENTING MULTICAST

CROSS-REFERENCE TO RELATED APPLICATION

This application is a continuation of International Patent Application No. PCT/CN2020/090725, filed on May 17, 2020, which claims priority to Chinese Patent Application No. 201910492933.X, filed on Jun. 6, 2019. The disclosures of the aforementioned applications are hereby incorporated by reference in their entireties.

TECHNICAL FIELD

This application relates to the field of communications technologies, and in particular, to a method and apparatus for implementing multicast.

BACKGROUND

When being forwarded in a network, traffic may pass through a plurality of different data centers (DCs). Traffic is usually transmitted from an edge device in one DC to an edge device in another DC, to implement cross-DC forwarding. In many networks, a same network device is used as an edge device by two adjacent DCs. To be specific, edge devices of the two adjacent DCs are integrated into one network device, and the network device may be referred to as an integrated device. However, if the traffic in a transmission path between a multicast source and a multicast user needs to be forwarded from one DC to another DC through an integrated device, the multicast source cannot provide a multicast service for the multicast user.

SUMMARY

Based on this, embodiments of this application provide a method and apparatus for implementing multicast, so that when a multicast source and a multicast user that are located in different DCs communicate with each other through an integrated device, the multicast source can provide a multicast service for the multicast user.

According to a first aspect, an embodiment of the present disclosure provides a method for implementing multicast in a Next-Generation Multicast Virtual Private Network (NG MVPN). The method is applied to a network including a first network device, a second network device, and a third network device. In the network, the first network device is an edge device for mutual communication between a first DC and a second DC, the second network device is an edge device of the second DC and a third DC, and the third network device belongs to the first DC. In an embodiment of the method, the second network device sends a first route to the first network device, where the first route carries a second device identifier and a second autonomous system (AS) number, where the second device identifier indicates the second network device and a first Virtual Private Network (VPN) instance corresponding to the second network device, and the second AS number indicates the second DC; the first network device determines a second route based on the first route, where the second route is obtained by the first network device by updating the second device identifier in the first route to a first device identifier and updating the second AS number in the first route to a first AS number, where the first device identifier indicates the first network device and a second VPN instance corresponding to the first network device, and the first AS number indicates the first DC; and the first network device sends the second route to the third network device. It can be learned that according to the foregoing method provided in this embodiment of the present disclosure, an upstream multicast source of the second network device completes route advertisement. If a downstream multicast user of the third network device joins the multicast source, the third network device in the network may trace to the first network device based on the received second route. Similarly, the first network device may trace to the second network device based on the received first route. In this way, a multicast path from the multicast source to the multicast user can be determined. Therefore, it is possible to accurately perform, in the NG MVPN, cross-DC multicast on traffic of the multicast source. In other words, when multicast sources and multicast users that are located in different DCs communicate with each other through an integrated device, the multicast source can provide a multicast service for the multicast user.

With reference to a possible implementation of the first aspect, the first route includes a second virtual routing and forwarding (VRF)route import extended community attribute and a second source AS extended community attribute, the second VRF route import extended community attribute includes the second device identifier, and the second source AS extended community attribute includes the second AS number. In addition, the second route includes a first VRF route import extended community attribute and a first source AS extended community attribute, the first VRF route import extended community attribute includes the first device identifier, and the first source AS extended community attribute includes the first AS number. It can be learned that, when the multicast source performs route advertisement, the device identifiers and the AS numbers are carried in the foregoing two extended community attributes. In the cross-DC integrated device, the device identifiers and the AS numbers that are in the two extended community attributes are replaced with a device identifier and an AS number that are corresponding to the cross-DC integrated device, and the updated two extended community attributes are carried in the routes to continue to be advertised in the network. This provides a basis for the multicast source to provide the multicast service in the network.

It may be understood that the first route is a Border Gateway Protocol (BGP) VPN route, e.g., a BGP VPNv4 route. The second route is a BGP Ethernet VPN (EVPN) route, e.g., an Internet Protocol (IP) prefix route (also referred to as a type 5 route) or a media access control (MAC)/IP advertisement route (also referred to as a type 2 route) of a BGP EVPN protocol. It should be noted that the first route and the second route may also be the same, e.g., both are a BGP VPN route or the BGP EVPN route.

The second DC and the third DC belong to a same domain.

With reference to another possible implementation of the first aspect, a process of establishing a first transmission path from the second network device to the first network device and a process of establishing a second transmission path from the first network device to the third network device may include the first network device receives first path information sent by the second network device, and determines the first transmission path based on the first path information; and the first network device sends second path information to the third network device, where the second path information is used to indicate the third network device to determine the second transmission path. After the transmission path is established, the transmission path has a corresponding path identifier that may be subsequently used when a multicast entry is created on a network node.

It may be understood that both the first transmission path and the second transmission path are Inclusive-Provider Multicast Service Interface (I-PMSI) tunnels. In this way, the first transmission path is used as an example. It is assumed that the DC further includes a fourth network device in addition to the first network device and the second network device. In this case, the first transmission path is a path from the second network device to the first network device and a path from the second network device to the fourth network device, and the second network device is a root node.

With reference to yet another possible implementation of the first aspect, when the downstream multicast user of the third network device requests to join the upstream multicast source of the second network device, this embodiment of the present disclosure may further include the following steps. Step 1: The third network device sends a third route to the first network device, where the third route carries the first device identifier and the first AS number, and both the first route and the third route are used to indicate a first multicast source. Step 2: The first network device determines, based on the second network device identifier and the second AS number that are carried in the first route, that the first transmission path is used to receive traffic of the first multicast source, and determines, based on the second transmission path used to receive the third route, that the second transmission path is used to send the traffic of the first multicast source, where the first transmission path is a transmission path from the second network device to the first network device, and the second transmission path is a transmission path from the first network device to the third network device. Step 3: The first network device generates a first multicast entry, where the first multicast entry is used to indicate the first network device to receive the traffic of the first multicast source from the first transmission path and send the traffic of the first multicast source through the second transmission path. Step 4: The first network device determines a fourth route by updating the first device identifier in the third route to the second device identifier carried in the first route and updating the first AS number in the third route to the second AS number carried in the first route. Step 5: The first network device sends the fourth route to the second network device. It may be understood that both the third route and the fourth route are BGP customer multicast (BGP C-multicast) routes.

With reference to still another possible implementation of the first aspect, to save network resources, when multicast traffic that is of the first multicast source indicated by the first route and that is on the second network device exceeds a traffic threshold, a path may be switched, that is, a third transmission path from the second network device to the first network device is established. The third transmission path is a Selective-Provider Multicast Service Interface (S-PMSI) tunnel, and a corresponding multicast entry is recreated on a related network device. This embodiment of the present disclosure further includes: The first network device receives third path information sent by the second network device, and determines the third transmission path based on the third path information. If the multicast traffic is that of the first multicast source indicated by the first route and the multicast traffic on the second network device exceeds the traffic threshold, the first network device generates a second multicast entry. The second multicast entry is used to indicate the first network device to receive the traffic of the multicast source from the third transmission path and send the traffic of the multicast source through the second transmission path, and the third transmission path is an S-PMSI tunnel from the second network device to the first network device.

It may be understood that the third transmission path is the S-PMSI tunnel. In an embodiment, the DC further includes the fourth network device in addition to the first network device and the second network device. The third transmission path is a path from the second network device to the first network device. After the third transmission path is established, the third transmission path has a path identifier different from a path identifier of the first transmission path. Therefore, the multicast entry needs to be updated to prepare for subsequently providing the multicast service.

The following implementations are several possible implementations provided with reference to the first aspect when the third network device is connected upstream to the multicast source and the second network device is connected downstream to the multicast user. These implementations are similar to the case in which the third network device is connected downstream to the multicast user and the second network device is connected upstream to the multicast source and that is provided in the foregoing possible implementation of the first aspect. For related effects and detailed descriptions, refer to the foregoing descriptions.

With reference to a possible implementation of the first aspect, the method for implementing multicast provided in this embodiment of the present disclosure may include: The first network device receives a fifth route sent by the third network device, where the fifth route carries a third device identifier and the first autonomous system AS number, and the third device identifier indicates the third network device and a third VPN instance corresponding to the third network device; the first network device determines a sixth route based on the fifth route, where the sixth route is obtained by the first network device by updating the third device identifier in the fifth route to a fourth device identifier and updating the first AS number in the fifth route to the second AS number, and the fourth device identifier indicates the first network device and a fourth VPN instance corresponding to the first network device; and the first network device sends the sixth route to the second network device.

The fifth route includes a fifth VRF route import extended community attribute and a fifth source AS extended community attribute, the fifth VRF route import extended community attribute includes the third device identifier, and the fifth source AS extended community attribute includes the first AS number. The sixth route includes a sixth VRF route import extended community attribute and a sixth source AS extended community attribute, the sixth VRF route import extended community attribute includes the fourth device identifier, and the sixth source AS extended community attribute includes the second AS number.

It may be understood that the sixth route is a BGP EVPN route, and the fifth route is a BGP VPN route.

With reference to another possible implementation of the first aspect, this embodiment of the present disclosure further includes: The first network device receives fourth path information sent by the third network device, and determines the fourth transmission path based on the fourth path information; and the first network device sends fifth path information to the second network device, where the fifth path information is used to indicate the second network device to determine the fifth transmission path. Both the fourth transmission path and the fifth transmission path are I-PMSI tunnels.

With reference to yet another possible implementation of the first aspect, this embodiment of the present disclosure further includes: The first network device receives a seventh route sent by the second network device, where the seventh route carries the fourth device identifier and the second AS number, and both the fifth route and the seventh route are used to indicate a second multicast source; the first network device determines, based on the third network device identifier and the first AS number that are carried in the fifth route, that the fourth transmission path is used to receive traffic of the second multicast source, and determines, based on the fifth transmission path used to receive the seventh route, that the fifth transmission path is used to send the traffic of the second multicast source, where the fourth transmission path is a transmission path from the third network device to the first network device, and the fifth transmission path is a transmission path from the first network device to the second network device; the first network device generates a third multicast entry, where the third multicast entry is used to indicate the first network device to receive the traffic of the second multicast source from the fourth transmission path and send the traffic of the second multicast source through the fifth transmission path; the first network device determines an eighth route by updating the fourth device identifier in the seventh route to the third device identifier carried in the fifth route and updating the second AS number in the seventh route to the first AS number carried in the first route; and the first network device sends the eighth route to the third network device. Both the seventh route and the eighth route are BGP C-multicast routes.

With reference to still another possible implementation of the first aspect, this embodiment of the present disclosure further includes: If multicast traffic that is of the second multicast source indicated by the fifth route and that is on the first network device exceeds the traffic threshold, the first network device modifies the third multicast entry to a fourth multicast entry, where the fourth multicast entry is used to indicate the first network device to send, through a sixth transmission path, the traffic received from the fourth transmission path, and the sixth transmission path is a S-PMSI tunnel from the first network device to the second network device. The first network device sends sixth path information to the second network device, and determines the sixth transmission path based on the sixth path information.

According to a second aspect, an embodiment of the present disclosure further provides an apparatus for implementing multicast. The apparatus is applied to a first network device in a NG MVPN, and includes a receiving unit, a processing unit, and a sending unit.

The receiving unit is configured to receive a first route sent by a second network device, where a first data center DC includes the first network device, a second DC includes the first network device and the second network device, a third DC includes the second network device, the first network device is an edge device for mutual communication between the first DC and the second DC, and the first route carries a second device identifier and a second autonomous system AS number, where the second device identifier indicates the second network device and a first VPN instance corresponding to the second network device, and the second AS number indicates the second DC. The processing unit is configured to determine a second route based on the first route, where the second route is obtained by the first network device by updating the second device identifier in the first route to a first device identifier and updating the second AS number in the first route to a first AS number, where the first device identifier indicates the first network device and a second VPN instance corresponding to the first network device, and the first AS number indicates the first DC. The sending unit is configured to send the second route to a third network device, where the third network device belongs to the first DC.

The first route includes a second VRF route import extended community attribute and a second source AS extended community attribute, the second VRF route import extended community attribute includes the second device identifier, and the second source AS extended community attribute includes the second AS number. The second route includes a first VRF route import extended community attribute and a first source AS extended community attribute, the first VRF route import extended community attribute includes the first device identifier, and the first source AS extended community attribute includes the first AS number.

In an embodiment, the first route is a border gateway protocol BGP VPN route, and the second route is a BGP Ethernet virtual private network EVPN route.

In an embodiment, the second DC and the third DC belong to a same domain.

With reference to a possible implementation of the second aspect, the receiving unit in the apparatus is further configured to receive first path information sent by the second network device, and determine the first transmission path based on the first path information. The sending unit is further configured to send second path information to the third network device, where the second path information is used to indicate the third network device to determine the second transmission path. Both the first transmission path and the second transmission path are I-PMSI tunnels.

With reference to another possible implementation of the second aspect, the receiving unit in the apparatus is further configured to receive a third route sent by the third network device, where the third route carries the first device identifier and the first AS number, and both the first route and the third route are used to indicate a first multicast source. The processing unit is further configured to: determine, based on the second network device identifier and the second AS number that are carried in the first route, that the first transmission path is used to receive traffic of the first multicast source, and determine, based on the second transmission path used to receive the third route, that the second transmission path is used to send the traffic of the first multicast source; generate a first multicast entry; and determine a fourth route by updating the first device identifier in the third route to the second device identifier carried in the first route and updating the first AS number in the third route to the second AS number carried in the first route; where the first transmission path is a transmission path from the second network device to the first network device, and the second transmission path is a transmission path from the first network device to the third network device; and the first multicast entry is used to indicate the first network device to receive the traffic of the first multicast source from the first transmission path and send the traffic of the first multicast source through the second transmission path. The sending unit is further configured to send the fourth route to the second network device. Both the third route and the fourth route are BGP C-multicast routes.

With reference to yet another possible implementation of the second aspect, the processing unit in the apparatus is further configured to: generate a second multicast entry when multicast traffic is of the first multicast source indicated by the first route and exceeds a traffic threshold on the second network device, where the second multicast entry is used to indicate the first network device to receive the traffic of the multicast source from a third transmission path and send the traffic of the multicast source through the second transmission path, and the third transmission path is a S-PMSI tunnel from the second network device to the first network device.

With reference to still another possible implementation of the second aspect, the receiving unit in the apparatus is further configured to: receive third path information sent by the second network device, and determine the third transmission path based on the third path information.

With reference to yet another possible implementation of the second aspect, the receiving unit in the apparatus is further configured to receive a fifth route sent by the third network device, where the fifth route carries a third device identifier and the first autonomous system AS number, and the third device identifier indicates the third network device and a third VPN instance corresponding to the third network device. The processing unit is further configured to determine a sixth route based on the fifth route, where the sixth route is obtained by the first network device by updating the third device identifier in the fifth route to a fourth device identifier and updating the first AS number in the fifth route to the second AS number, and the fourth device identifier indicates the first network device and a fourth VPN instance corresponding to the first network device. The sending unit is further configured to send the sixth route to the second network device.

The fifth route includes a fifth VRF route import extended community attribute and a fifth source AS extended community attribute, the fifth VRF route import extended community attribute includes the third device identifier, and the fifth source AS extended community attribute includes the first AS number. The sixth route includes a sixth VRF route import extended community attribute and a sixth source AS extended community attribute, the sixth VRF route import extended community attribute includes the fourth device identifier, and the sixth source AS extended community attribute includes the second AS number.

It may be understood that the sixth route is a BGP EVPN route, and the fifth route is a BGP VPN route.

With reference to another possible implementation of the second aspect, the receiving unit in the apparatus is further configured to: receive fourth path information sent by the third network device, and determine the fourth transmission path based on the fourth path information. The sending unit is further configured to send fifth path information to the second network device, where the fifth path information is used to indicate the second network device to determine the fifth transmission path. Both the fourth transmission path and the fifth transmission path are I-PMSI tunnels.

With reference to another possible implementation of the second aspect, the receiving unit in the apparatus is further configured to receive a seventh route sent by the second network device, where the seventh route carries the fourth device identifier and the second AS number, and both the fifth route and the seventh route are used to indicate a second multicast source. The processing unit is further configured to: determine, based on the third network device identifier and the first AS number that are carried in the fifth route, that the fourth transmission path is used to receive traffic of the second multicast source, and determine, based on the fifth transmission path used to receive the seventh route, that the fifth transmission path is used to send the traffic of the second multicast source; generate a third multicast entry; and determine an eighth route by updating the fourth device identifier in the seventh route to the third device identifier carried in the fifth route and updating the second AS number in the seventh route to the first AS number carried in the first route; where the fourth transmission path is a transmission path from the third network device to the first network device, and the fifth transmission path is a transmission path from the first network device to the second network device; and the third multicast entry is used to indicate the first network device to receive the traffic of the second multicast source from the fourth transmission path and send the traffic of the second multicast source through the fifth transmission path. The sending unit is further configured to send the eighth route to the third network device. Both the seventh route and the eighth route are BGP C-multicast routes.

With reference to yet another possible implementation of the second aspect, the processing unit in the apparatus is further configured to: modify the third multicast entry to a fourth multicast entry when multicast traffic is of the second multicast source indicated by the fifth route and exceeds the traffic threshold on the first network device, where the fourth multicast entry is used to indicate the first network device to send, through a sixth transmission path, the traffic received from the fourth transmission path, and the sixth transmission path is a S-PMSI tunnel from the first network device to the second network device.

With reference to still another possible implementation of the second aspect, the sending unit in the apparatus is further configured to: send sixth path information to the second network device, and determine the sixth transmission path based on the sixth path information.

It may be understood that the apparatus provided in the second aspect is corresponding to the method provided in the first aspect. Therefore, for implementations of the second aspect and technical effects that can be achieved by the implementations of the second aspect, refer to related descriptions of the implementations of the first aspect.

According to a third aspect, an embodiment of the present disclosure further provides a network device. The network device includes a processor and a memory. The memory stores instructions, and when the processor executes the instructions, the network device is enabled to perform the method according to any one of the implementations of the first aspect.

According to a fourth aspect, an embodiment of the present disclosure further provides a computer program product. When the computer program product is run on a computer, the computer is enabled to perform the method according to any one of the implementations of the first aspect.

According to a fifth aspect, an embodiment of the present disclosure further provides a computer-readable storage medium. The computer-readable storage medium stores instructions. When the instructions are run on a computer or a processor, the computer or the processor is enabled to perform the method according to any one of the implementations of the first aspect.

DESCRIPTION OF EMBODIMENTS

Traffic may pass through a plurality of different DCs when being forwarded in a network. For example, in a DC interconnection (DCI) scenario, traffic in a first DC may be sent to a second DC through a provider backbone network. Usually, traffic is transmitted from a gateway device of the first DC to a gateway device of the second DC during cross-DC forwarding. For example, traffic in the first DC is sent by a gateway device of the first DC to a first provider edge (PE) device in the provider backbone network, is sent by the first PE device to a second PE device in the provider backbone network, and then is sent by the second PE device to a gateway device of the second DC. In this way, the traffic is forwarded from the first DC to the second DC.

In many networks, a same network device is used as an edge device by two adjacent DCs. To be specific, edge devices of the two adjacent DCs are integrated into one network device, and the network device may be referred to as an integrated device. For example, a PE device in the provider backbone network may be integrated into a gateway device of a DC. In other words, the gateway device of the DC is used as both the gateway device of the DC and the PE device in the provider backbone network.

Figure 1:
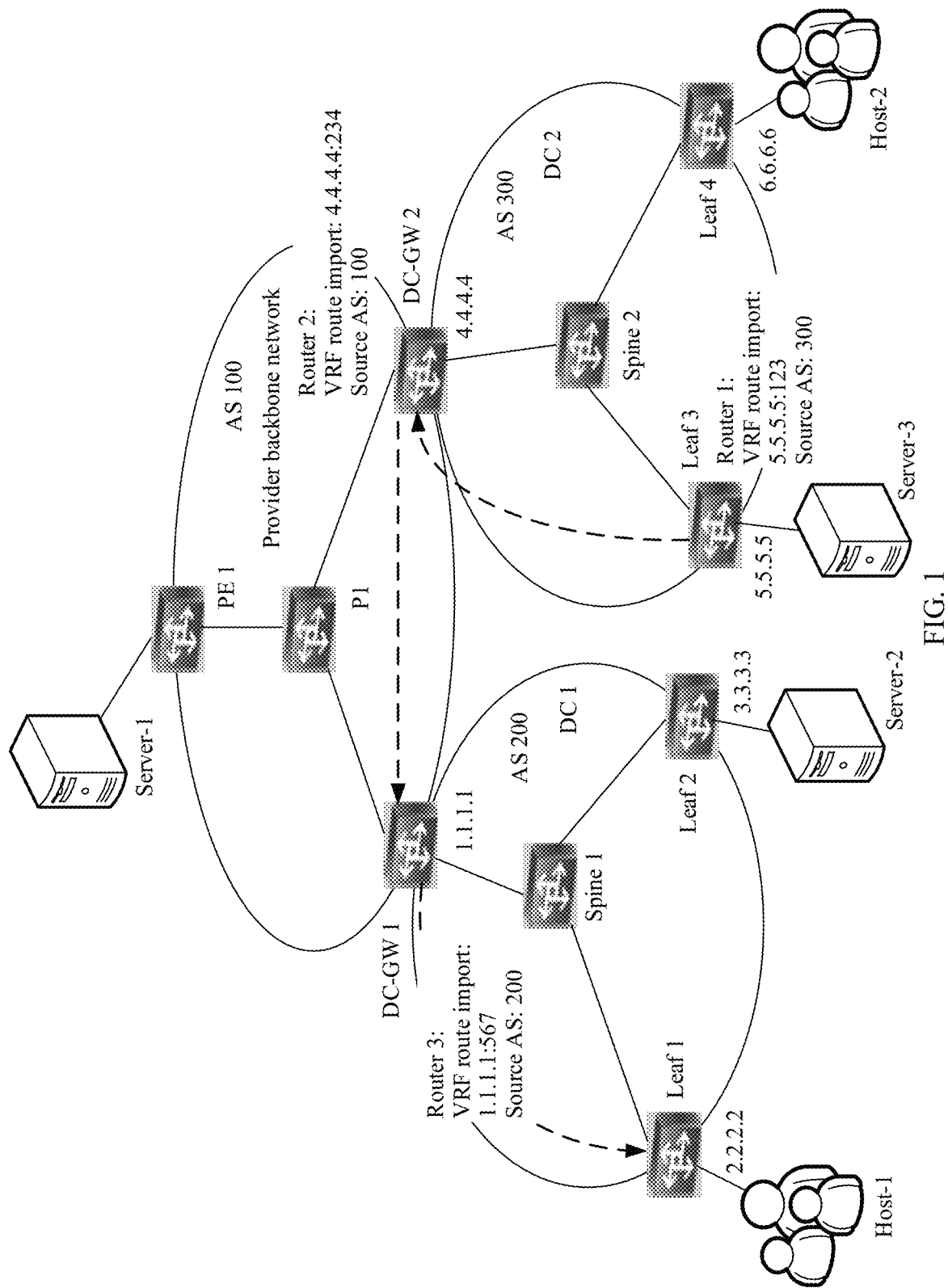
FIG. 1 is a schematic diagram of a framework of a network in a scenario according to an embodiment of the present disclosure.

FIG. 1 is a schematic structural diagram of a network according to an embodiment of the present disclosure. The network includes three domains: a DC 1, a provider backbone network, and a DC 2. An AS number corresponding to the provider backbone network is 100, an AS number corresponding to the DC 1 is 200, and an AS number corresponding to the DC 2 is 300. In addition, the DC 1 and the provider backbone network have an integrated device DC-gateway (GW) 1, and the DC 2 and the provider backbone network have an integrated device DC-GW 2. It should be noted that the DC-GW 1 is an integrated device formed by integrating a PE device in the provider backbone network into a gateway device of the DC 1, and is also used as an edge device shared by the provider backbone network and the DC 1. Similarly, the DC-GW 2 is an integrated device formed by integrating a PE device in the provider backbone network into a gateway device of the DC 2, and is also used as an edge device shared by the provider backbone network and the DC 2.

If the DC 1 is a Virtual eXtensible Local Area Network (VXLAN) network, the DC 1 may include the DC-GW 1, a leaf node leaf 1, a leaf node leaf 2, and a backbone node spine 1. An identifier of the DC-GW 1 is 1.1.1.1, an identifier of the leaf 1 is 2.2.2.2, an identifier of the leaf 2 is 3.3.3.3, the leaf 1 is connected to a user host-1, and the leaf 2 is connected to a server-2. The provider backbone network includes the DC-GW 1, the DC-GW 2, a transit node P3, and a provider edge device PE 1. An identifier of the DC-GW 2 is 4.4.4.4, and the PE 1 is connected to a server-1. If the DC 2 is also a VXLAN network, the DC 2 may include the DC-GW 2, a leaf node leaf 3, a leaf node leaf 4, and a backbone node spine 3. An identifier of the leaf 3 is 5.5.5.5, an identifier of the leaf 4 is 6.6.6.6, the leaf 4 is connected to a user host-2, and the leaf 3 is connected to a server-3. It should be noted that each edge device may be connected to a user or a server. FIG. 1 shows only one scenario.

The network shown in FIG. 1 is used as an example. If the server-3 is a multicast source, a route advertisement process of the multicast source includes: The leaf 3 in the DC 2 generates routing information carrying an extended community attribute corresponding to the leaf 3; the leaf 3 sends routing information to the DC-GW 2; the DC-GW 2 directly forwards the routing information to the DC-GW 1 without processing the routing information; and the DC-GW 1 directly forwards the routing information to leaf 1 without processing the routing information. However, when a downstream multicast user of the leaf 1 wants to join the multicast source server-3, because the leaf 1 belongs to the DC 1, and an edge device in the DC 1 can identify only another edge device in the local DC, the leaf 1 cannot trace to the DC-GW 2 or the leaf 3 in the DC 2 at all based on the extended community attribute that is corresponding to the leaf 3 and that is carried in the received routing information. In this way, a multicast path from the multicast source to the multicast user cannot be determined. As a result, a multicast service cannot be provided for the multicast user.

Based on this, in an embodiment of the present disclosure, route update is performed on the cross-DC integrated device. For example, on the integrated device DC-GW 2, a device identifier and an AS number that are corresponding to the leaf 3 and that are carried in a route received from the edge device leaf 3 of the DC 2 are respectively replaced with a device identifier and an AS number that are corresponding to the DC-GW 2, and then the updated route is sent to the edge device DC-GW 1 in the provider backbone network to which the DC-GW 1 belongs. On the integrated device DC-GW 1, the device identifier and the AS number that are corresponding to the DC-GW 2 and that are carried in the route received from the edge device DC-GW 2 in the provider backbone network are respectively replaced with a device identifier and an AS number that are corresponding to the DC-GW 1, and then the updated route is sent to the edge device leaf 1 of the DC 1 to which the DC-GW 1 belongs. In this way, if the downstream multicast user of the leaf 1 joins the multicast source, the leaf 1 in the network may trace to the leaf 3 based on the received routing information. In other words, the network device may determine the multicast path from the multicast source to the multicast user based on the received route, so that the multicast source can forward multicast traffic to the corresponding multicast user, to provide the multicast service for the multicast user.

It should be noted that a network architecture shown in FIG. 1 is merely an example of a scenario to which the embodiments of the present disclosure are applicable, and the embodiments of the present disclosure are not limited to this scenario.

In an embodiment, before the multicast source performs multicast, the multicast source advertises a private network route, that is, sends an address of the multicast source to all network devices in the network, to notify the network devices of a location of the multicast source in the network, so that the network devices in the network can accurately locate the multicast source. In an embodiment, if a multicast user requests to access the multicast source after the multicast source completes the advertisement of the private network route, a corresponding multicast entry is created on a network device that a transmission path of the multicast traffic passes through, so that subsequent traffic of the multicast source can be accurately sent to the corresponding multicast user. This implements a function that the multicast source accurately provides the multicast service for the accessed multicast user.

With reference to the accompanying drawings, the following describes the method for implementing multicast provided in the embodiments of the present disclosure.

A process in which the multicast source advertises the private network route is described with reference to FIG. 2 by using the network shown in FIG. 1 as a scenario.

It is assumed that the multicast source is the server-3. A process in which the server-3 advertises a route to the leaf 1 in the DC 1 domain is used as an example. For a process in which the server-3 advertises a private network route, refer to the flowchart shown in FIG. 2. The process may include the following step 201 to step 211.

Step 201: The server-3 sends an address of the server-3 to the leaf 3.

Step 202: The leaf 3 receives and stores the address of the server-3 sent by the server-3.

Step 203: The leaf 3 generates a route 1 based on the address of the server-3.

It may be understood that, the route 1 carries a VRF route import extended community attribute and a source AS extended community attribute. For specific descriptions of the two extended community attributes, refer to descriptions in the Request for Comments (RFC) 6513 and the RFC 6514 in the Internet Engineering Task Force (IETF). The RFC 6513 and the RFC 6514 are incorporated into the present disclosure by reference in their entireties. The VRF route import extended community attribute (namely, a device identifier in a subsequent embodiment) is used to indicate a network device that generates and sends the route, so that a next-hop device that receives the route determines a source of the route. The source AS extended community attribute (namely, an AS number in a subsequent embodiment) is used to identify the AS domain of the network device. For example, the foregoing two extended community attributes may be carried in a network layer reachability information (NLRI) field in the route.

The VRF route import extended community attribute of the route 1 includes a device identifier 1 that is used to indicate an identifier of the leaf 3 and a VPN instance corresponding to the leaf 3. The source AS extended community attribute of the route 1 includes an AS number. In the network shown in FIG. 1, the device identifier 1 may be 5.5.5.5:123. 5.5.5.5 is the identifier of the leaf 3, and 123 is an identifier of the VPN instance configured by the leaf 3 for the server-3. The AS number may be 300, and 300 is an AS number corresponding to an AS domain to which the leaf 3 belongs.

Step 204: The leaf 3 sends the route 1 to the DC-GW 2 through the DC 2.

Step 205: The DC-GW 2 receives and stores the route 1 sent by the leaf 3.

Step 206: The DC-GW 2 determines a route 2 based on the route 1.

In an implementation, the DC-GW 2 updates the VRF route import extended community attribute and the source AS extended community attribute in the route 1 to obtain the route 2. An update process includes: replacing the device identifier 1 with a device identifier 2, and replacing the AS number. In an embodiment, the identifier 5.5.5.5 of the leaf 3 in the device identifier 1 is replaced with an identifier 4.4.4.4 of the DC-GW 2 in the device identifier 2, and the VPN instance 123 corresponding to the leaf 3 in the device identifier 1 is replaced with a VPN instance identifier 234 that is in the device identifier 2 and that is configured by the DC-GW 2 for the server-3. The AS number 300 is replaced with an AS number 100 corresponding to another AS domain to which the DC-GW 2 belongs.

Step 207: The DC-GW 2 sends the route 2 to the DC-GW 1 through the provider backbone network.

Step 208: The DC-GW 1 receives and stores the route 2 sent by the DC-GW 2.

Step 209: The DC-GW 2 determines a route 3 based on the route 2.

In an implementation, the DC-GW 1 updates the VRF route import extended community attribute and the source AS extended community attribute in the route 2 to obtain the route 3. An update process includes: replacing the device identifier 2 with a device identifier 3, and replacing the AS number. In an embodiment, the identifier 4.4.4.4 of the DC-GW 2 in the device identifier 2 is replaced with an identifier 1.1.1.1 of the DC-GW 1 in the device identifier 3, and the VPN instance 234 corresponding to the DC-GW 2 in the device identifier 2 is replaced with a VPN instance identifier 567 that is in the device identifier 3 and that is configured by the DC-GW 1 for the server-3. The AS number 100 is replaced with an AS number 200 corresponding to another AS domain to which the DC-GW 1 belongs.

Step 210: The DC-GW 1 sends the route 3 to the leaf 1 through the DC 1.

Step 211: The leaf 1 receives and stores the route 3 sent by the DC-GW 1.

The route 1 is a route stored by the multicast source server-3 on the DC-GW 2, the route 2 is a route stored by the multicast source server-3 on the DC-GW 1, and the route 3 is a route stored by the multicast source server-3 on the leaf 1. The route 1 to the route 3 can all indicate the multicast source server-3.

It should be noted that the route 1 to the route 3 may be routes that use various BGP VPN protocols and that are applicable to a corresponding domain, and the three routes may use same or different VPN protocols. In an embodiment, the route 1 and the route 3 may be BGP EVPN routes, e.g., IP prefix routes (also referred to as type 5 routes) or MAC/IP advertisement routes (also referred to as type 2 routes) using a BGP EVPN protocol, and the route 2 may be a BGP VPN route, e.g., a BGP VPNv4 route. For another example, the route 1 to the route 3 may all be the BGP VPN route. For yet another example, the route 1 to the route 3 may alternatively be the BGP EVPN route. For detailed descriptions of the IP prefix route (also referred to as the type 5 route) or the MAC/IP advertisement route using the BGP EVPN protocol, refer to descriptions in the RFC 7432. The RFC 7432 is incorporated into the present disclosure by reference in its entirety.

It should be noted that, the foregoing is only a related description of advertising, by the multicast source server-3, the private network route to the leaf 1. For a process in which the server-3 advertises a private network route to another network device and a process in which another multicast source advertises a private network route to the network device in the network, refer to related descriptions of the method provided in the embodiment corresponding to FIG. 2.

According to the foregoing method provided in this embodiment of the present disclosure, an upstream multicast source of the leaf 3 completes the route advertisement. To be specific, after route update is separately performed on the integrated devices DC-GW 1 and DC-GW 2, an updated route is advertised to a downstream device. In this way, if the downstream multicast user of the leaf 1 joins the multicast source, the network devices in the network may trace to an upstream network device based on the received route. Thus, the multicast path from the multicast source to the multicast user can be determined. Therefore, it is possible to accurately perform, in the NG MVPN, cross-DC multicast on the traffic of the multicast source.

A process in which the multicast user requests to access the multicast source and the network devices create the multicast entry is described with reference to the accompanying drawings by using the network shown in FIG. 1 as a scenario.

A process in which in the network shown in FIG. 1, the multicast user host-1 requests to join the multicast source server-3 is used as an example. After the embodiment corresponding to FIG. 2, a process in which the host-1 requests to join the server-3 and a multicast entry is created may be referred to the flowchart shown in FIG. 3A and FIG. 3B. The process may include the following step 301 to step 313.

Step 301: The host-1 sends a joining request message to the leaf 1.

It may be understood that the joining request message carries an address of a multicast source, for example, the address of the server-3, which is used to indicate the multicast source server-3.

Step 302: The leaf 1 finds, based on the address of the multicast source, the route 3 that is stored on the leaf 1 and that is corresponding to the multicast source.

Step 303: The leaf 1 determines, based on the route 3, that the leaf 1 should make a request to the DC-GW 1 for adding the multicast member host-1, and creates a multicast entry 1.

In an implementation, the leaf 1 may determine, based on the route 3, to receive the multicast traffic through a tunnel from the DC-GW 1 to the leaf 1, and may further determine to send the multicast traffic through a path from the leaf 1 to the host-1. Therefore, the leaf 1 may create the multicast entry 1 based on the route 3.

The multicast entry includes at least an address of the multicast source server-3, an address of the multicast user host-1, an upstream interface, and a downstream interface. An identifier of the upstream interface in the multicast entry 1 is an identifier of the tunnel from the DC-GW 1 to the leaf 1, and an identifier of the downstream interface is an identifier of an interface that is on the leaf 1 and that is connected to the host-1.

Figure 4:
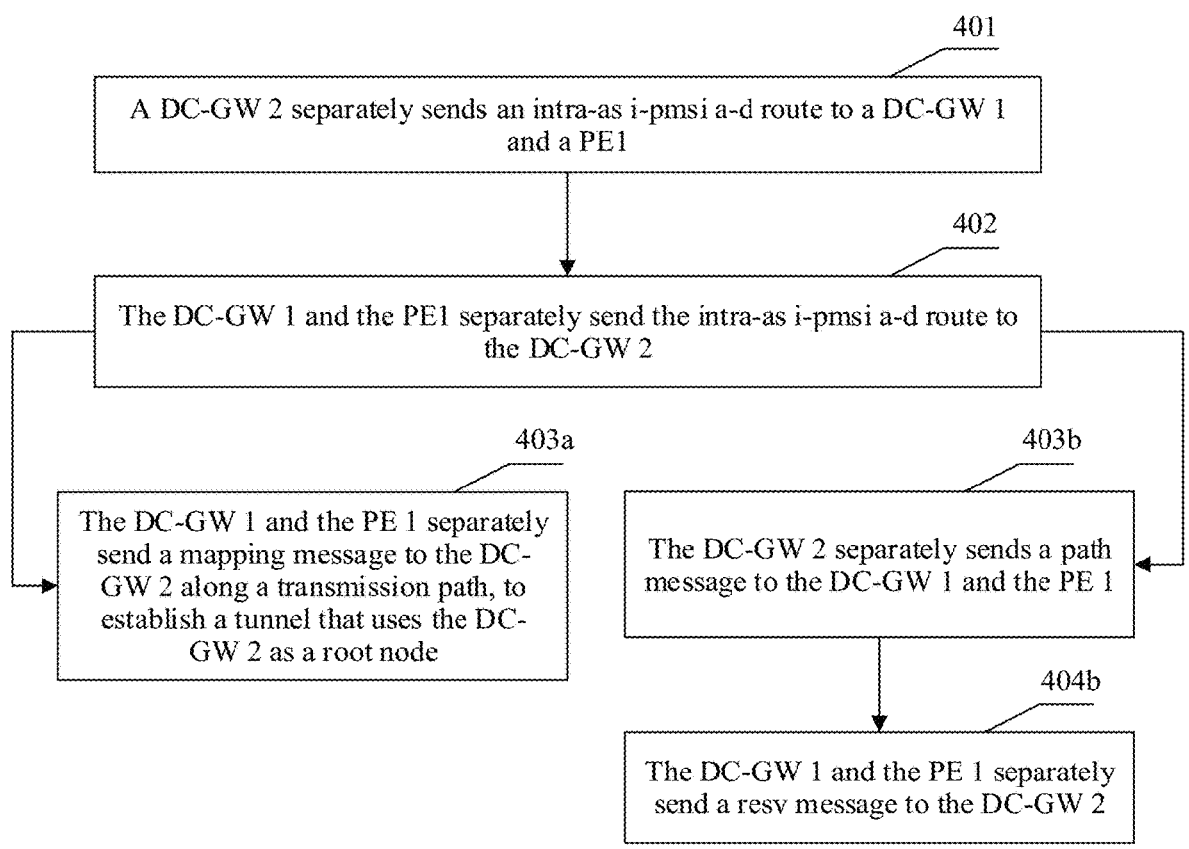
FIG. 4 is a flowchart of a method for creating a tunnel according to an embodiment of the present disclosure.

It should be noted that for related descriptions of the tunnel and the identifier of the tunnel mentioned in this embodiment of the present disclosure, refer to related descriptions of the following embodiment corresponding to FIG. 4.

Step 304: The leaf 1 sends a BGP C-multicast route 1 to the DC-GW 1.

It may be understood that the BGP C-multicast route 1 may carry an address of a multicast source and an address of a multicast member, for example, the address of the server-3 and the address of the host-1, which are used to request to add the multicast member host-1 to the server-3 and trigger the DC-GW 1 to create a corresponding multicast entry 2. In addition, the BGP C-multicast route 1 carries the device identifier 3 and the AS number. The device identifier 3 includes the identifier of the DC-GW 1, the VPN instance identifier configured by the DC-GW 1 for the server-3, and the AS number is 200. For a description of the BGP C-multicast route, refer to the description in the RFC 6513. The RFC 6513 is incorporated in the present disclosure by reference in its entirety.

It should be noted that the BGP C-multicast route 1 may be sent by a network device to neighboring devices of the network device in a broadcast manner. The BGP C-multicast route 1 carries at least the address of the multicast source, the device identifier 3, and the AS number. After receiving the BGP C-multicast route 1, each neighboring device checks whether the device identifier 3 carried in the BGP C-multicast route 1 matches the neighboring device. If yes, the neighboring device processes the BGP C-multicast route 1, and if no, the neighboring device discards the BGP C-multicast route 1 without processing the BGP C-multicast route 1. For example, the process when the leaf 1 sends a BGP C-multicast route 1 to the DC-GW 1 may include: The leaf 1 broadcasts the BGP C-multicast route 1 to neighboring devices such as the DC-GW 1 and the leaf 2, where the BGP C-multicast route 1 carries the identifier of the DC-GW 1. In a network device that receives the BGP C-multicast route 1, only the DC-GW 1 processes the BGP C-multicast route 1. To be specific, the DC-GW 1 creates the multicast entry 2, and sends a BGP C-multicast route 2 to the DC-GW 2.

Step 305: The DC-GW 1 finds, based on the address of the multicast source in the received BGP C-multicast route 1, the route 2 that is stored on the DC-GW 1 and that is corresponding to the multicast source.

Step 306: The DC-GW 1 determines, based on the route 2, that the DC-GW 1 should make a request to the DC-GW 2 for adding the multicast member host-1, and creates the multicast entry 2.

In an implementation, the DC-GW 1 may determine, based on the route 2, to receive the multicast traffic through a tunnel from the DC-GW 2 to the DC-GW 1, and may further determine to send the multicast traffic through the tunnel from the DC-GW 1 to the leaf 1. Therefore, the DC-GW 1 may create the multicast entry 2 based on the route 2.

In an embodiment, an identifier of an upstream interface in the multicast entry 2 is an identifier of the tunnel from the DC-GW 2 to the DC-GW 1, and an identifier of a downstream interface is the identifier of the tunnel from the DC-GW 1 to the leaf 1.

Step 307: The DC-GW 1 sends the BGP C-multicast route 2 to the DC-GW 2.

Step 308: The DC-GW 2 finds, based on the address of the multicast source in the received BGP C-multicast route 2, the route 1 that is stored on the DC-GW 2 and that is corresponding to the multicast source.

Step 309: The DC-GW 2 determines, based on the route 1, that the DC-GW 2 should make a request to the leaf 3 for adding the multicast member host-1, and creates a multicast entry It may be understood that the BGP C-multicast route 2 carries at least the address of the multicast source, the device identifier 2, and the AS number. For example, the process when the DC-GW 1 sends the BGP C-multicast route 2 to the DC-GW 2 may include: The DC-GW 1 broadcasts the BGP C-multicast route 2 to neighboring devices such as the DC-GW 2 and the PE 1, where the BGP C-multicast route 2 carries the identifier of the DC-GW 2. In a network device that receives the BGP C-multicast route 2, only the DC-GW 2 processes the BGP C-multicast route 2. To be specific, the DC-GW 2 creates the multicast entry 3, and sends a BGP C-multicast route 3 to the leaf 3.

In an implementation, the DC-GW 2 may determine, based on the route 1, to receive the multicast traffic through a tunnel from the leaf 3 to the DC-GW 2, and may further determine to send the multicast traffic through the tunnel from the DC-GW 2 to the DC-GW 1. Therefore, the DC-GW 2 may create the multicast entry 3 based on the route 1.

In an embodiment, an identifier of an upstream interface in the multicast entry 3 is an identifier of the tunnel from the leaf 3 to the DC-GW 2, and an identifier of a downstream interface is the identifier of the tunnel from the DC-GW 2 to the DC-GW 1.

Step 310: The DC-GW 2 sends the BGP C-multicast route 3 to the leaf 3.

Step 311: The leaf 3 finds, based on the address of the multicast source in the received BGP C-multicast route 3, a multicast source address that is stored on the leaf 3 and that is corresponding to the multicast source.

Step 312: The leaf 3 determines, based on the multicast source address, that the leaf 3 should make a request to the server-3 for adding the multicast member host-1, and creates a multicast entry 4.

In an embodiment, the BGP C-multicast route 3 carries at least the address of the multicast source, the device identifier 1, and the AS number. For example, the process when the DC-GW 2 sends the BGP C-multicast route 3 to the leaf 3 may include: The DC-GW 2 broadcasts the BGP C-multicast route 3 to neighboring devices such as the leaf 3 and the leaf 4, where the BGP C-multicast route 3 carries the identifier of the leaf 3. In a network device that receives the BGP C-multicast route 3, only the leaf 3 processes the BGP C-multicast route 3. To be specific, the leaf 3 creates the multicast entry 4, and sends a joining request message to the server-3.

In an implementation, the leaf 3 may determine to receive the multicast traffic through a path from the server-3 to the leaf 3, and may further determine to send the multicast traffic through a tunnel from the leaf 3 to the DC-GW 1. Therefore, the leaf 3 may further create the multicast entry 4.

In an embodiment, an identifier of an upstream interface in the multicast entry 4 is an identifier of an interface that is on the leaf 3 and that is connected to the server-3, and an identifier of a downstream interface in the multicast entry 4 is an identifier of the tunnel from the leaf 3 to the DC-GW 2.

Step 313: The leaf 3 sends the joining request message to the server-3.

It may be understood that the joining request message carries an address of a multicast user requesting to join the server-3, for example, the address of the host-1, which is used to indicate that the multicast user host-1 requests to join the multicast source server-3.

In this way, the multicast user host-1 joins the server-3 and becomes a target that the server-3 provides the multicast service. In addition, corresponding multicast entries are created on each edge device on a multicast path from the multicast source server-3 to the multicast user host-1. This ensures that the multicast traffic provided by the multicast source server-3 can be accurately received by the multicast user host-1.

Figure 3A:
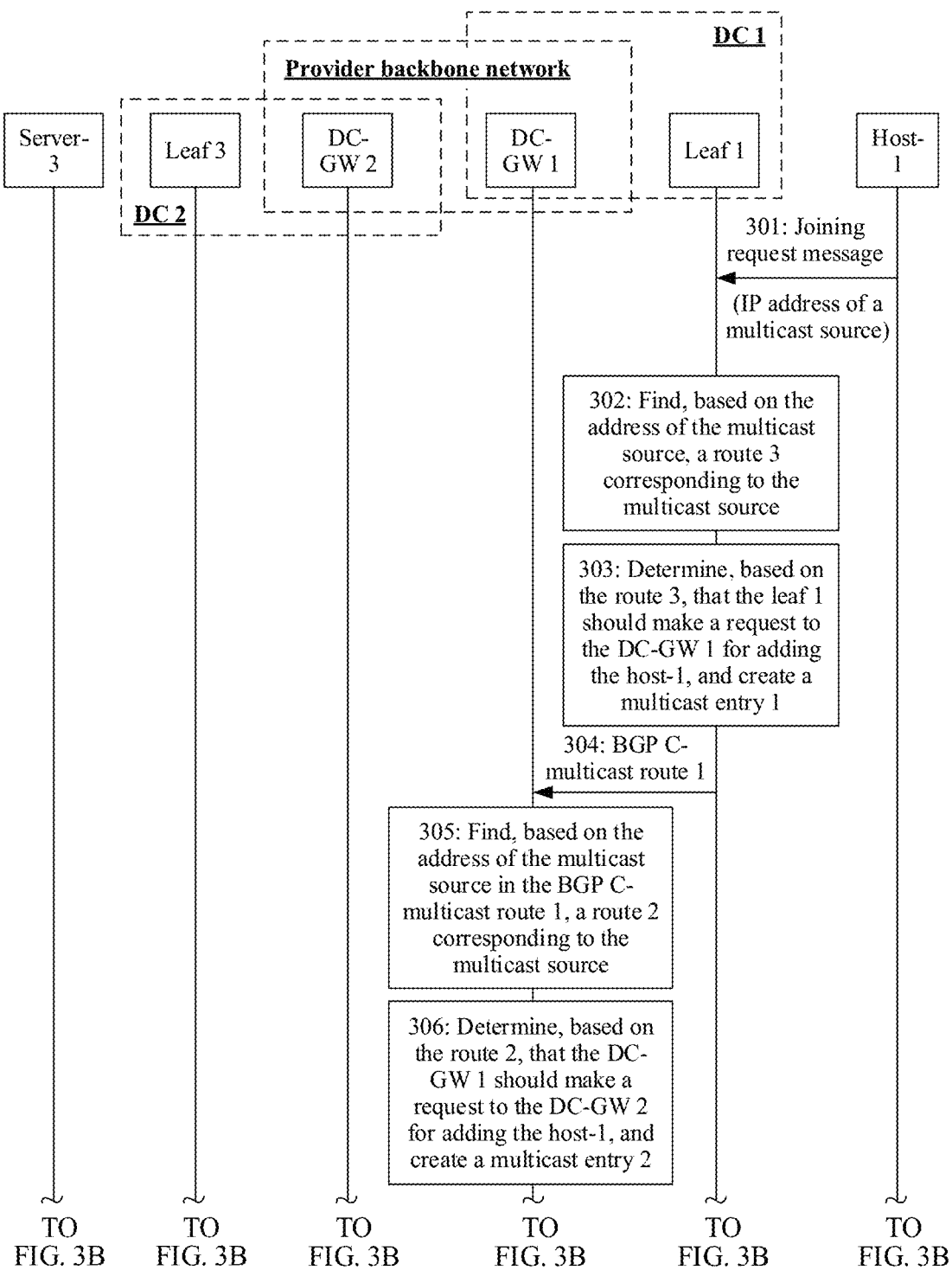
FIG. 3A and FIG. 3B are a signaling flowchart of another method for implementing multicast according to an embodiment of the present disclosure.
Figure 3B:
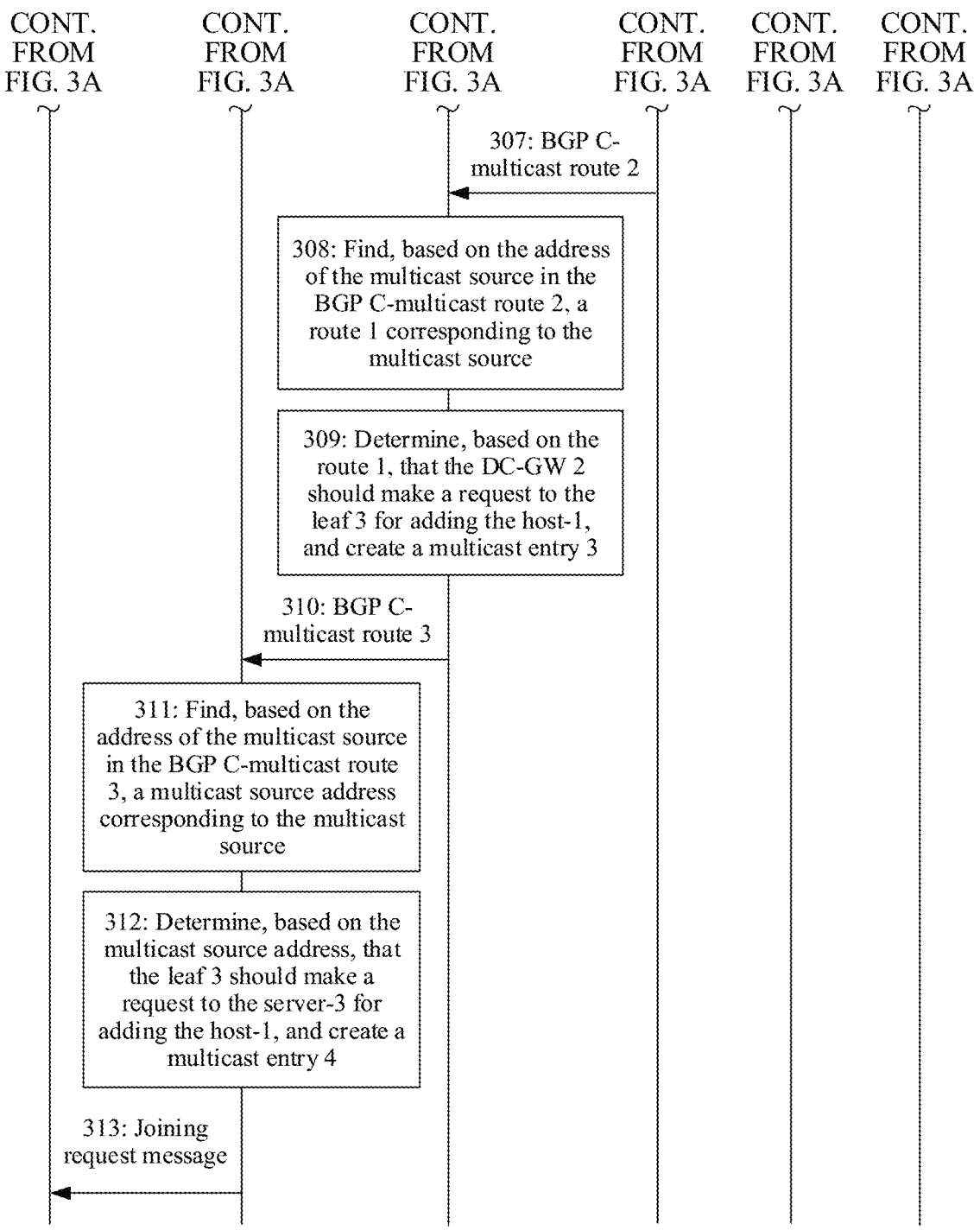

It should be noted that, for a process in which any other multicast user requests to join the multicast source and a corresponding multicast entry is created on a network device that the transmission path of the multicast traffic may pass through, refer to the method provided in the embodiment corresponding to FIG. 3A and FIG. 3B.

According to the foregoing method provided in this embodiment of the present disclosure, the routing information is updated when the route is advertised, and the multicast entry is created based on the updated routing information, to ensure that the multicast traffic sent from the multicast source can be accurately forwarded to the multicast user that has joined the multicast source. This ensures that the multicast service can be provided for the multicast user.

A process of establishing the tunnel mentioned in this embodiment of the present disclosure may be described by using an example in which a process of establishing an I-PMSI tunnel that is from the DC-GW 2 to the DC-GW 1 in the network shown in FIG. 1.

In an implementation, if the DC-GW 2 needs to establish the I-PMSI tunnel to the DC-GW 1, for an example of an establishment process, refer to the flowchart shown in FIG. 4. The process may include the following steps.

Step 401: The DC-GW 2 separately sends an intra AS inclusive provider multicast service interface auto discovery Intra-AS I-PMSI A-D route to the DC-GW 1 and the PE 1.

It may be understood that a provider backbone network domain to which the DC-GW 1 and the DC-GW 2 both belong includes three edge devices. In an embodiment, step 401 includes: The DC-GW 2 separately sends the Intra-AS I-PMSI A-D route to the other two edge devices in the domain, namely, the DC-GW 1 and the PE 1. The Intra-AS I-PMSI A-D route includes path information of a to-be-established tunnel, and the path information of the to-be-established tunnel includes the identifier of the DC-GW 2 and an identifier of the to-be-established tunnel.

It should be noted that for the integrated devices DC-GW 1 and DC-GW 2, before the tunnel is established, a domain to which the to-be-established tunnel belongs may be identified, and different path information is carried in the Intra-AS I-PMSI A-D route based on different domains to which the to-be-established tunnel belongs. In this way, a corresponding tunnel may be established in each domain, where the tunnel is applicable to the domain. For example, for the DC-GW 2, if the tunnel from the DC-GW 2 to the DC-GW 1 is established, path information that is of the tunnel and that is in the provider backbone network is carried in the Intra-AS I-PMSI A-D route. If the tunnel from the leaf 3 to the DC-GW 2 is established, path information that is of the tunnel and that is in the DC 2 is carried in the Intra-AS I-PMSI A-D route. In this way, different types of tunnels may be established in different domains.

Step 402: The DC-GW 1 and the PE 1 separately send the Intra-AS I-PMSI A-D route to the DC-GW 2.

In an embodiment, the Intra-AS I-PMSI A-D route does not include the identifier of the to-be-established tunnel.

If the tunnel is established by using a Label Distribution Protocol(LDP) manner, after step 402 is performed, establishment of the tunnel may be completed through the following step 403*a*. If the tunnel is established in a traffic engineering (TE) manner, after step 402 is performed, establishment of the tunnel may be further completed through the following step 403*b* and step 404*b*.

Step 403*a*: The DC-GW 1 and the PE 1 separately send a mapping message to the DC-GW 2 along the transmission path, to establish a tunnel that uses the DC-GW 2 as a root node.

It may be understood that, because the mapping message is used to allocate a label to each node of the tunnel, record labels in sequence, and forward the labels to the DC-GW 2 hop by hop along with the mapping message, the DC-GW 2 has a label stack of the tunnel from the DC-GW 2 to the DC-GW 1 and a label stack of the tunnel from the DC-GW 2 to the PE 1, and the label stacks are used to forward the multicast traffic in the two tunnels.

Step 403b: The DC-GW 2 separately sends a path message to the DC-GW 1 and the PE 1.

Step 404b: The DC-GW 1 and the PE 1 separately send a reservation request (resv) message to the DC-GW 2.

It may be understood that the path message and the resv message are used to establish the tunnel from the DC-GW 2 to the DC-GW 1 and the tunnel from the DC-GW 2 to the PE 1.

In an embodiment, the tunnel from the DC-GW 2 to the DC-GW 1 and the tunnel from the DC-GW 2 to the PE 1 can be established through the foregoing step 401, step 402, and step 403a, or through the foregoing step 402, step 403b, and step 404b.

It should be noted that the identifier of the tunnel from the DC-GW 2 to the DC-GW 1 is consistent with the identifier of the tunnel from the DC-GW 2 to the PE 1, and the identifier of the tunnel may be used as the identifier of the upstream interface in the multicast entry 2 or the identifier of the downstream interface in the multicast entry 3 in the embodiment corresponding to FIG. 3A and FIG. 3B.

It should be noted that, in the network shown in FIG. 1, for establishment of the tunnel from the leaf 3 to the DC-GW 2, the tunnel from the DC-GW 1 to the leaf 1, or a tunnel in the network in another scenario, refer to the embodiment corresponding to FIG. 4.

It should be noted that a type of an established tunnel may be determined based on a requirement and a specific protocol supported by a network. For example, both the tunnel from the leaf 3 to the DC-GW 2 and the tunnel from the DC-GW 1 to the leaf 1 may be a protocol independent multicast-sparse mode (PIM-SM) tunnel of a virtual extensible local area network (VXLAN) protocol. The tunnel from the DC-GW 2 to the DC-GW 1 may be a multipoint extensions for LDP (mLDP) point-to-multipoint (P2MP) tunnel.

Figure 2:
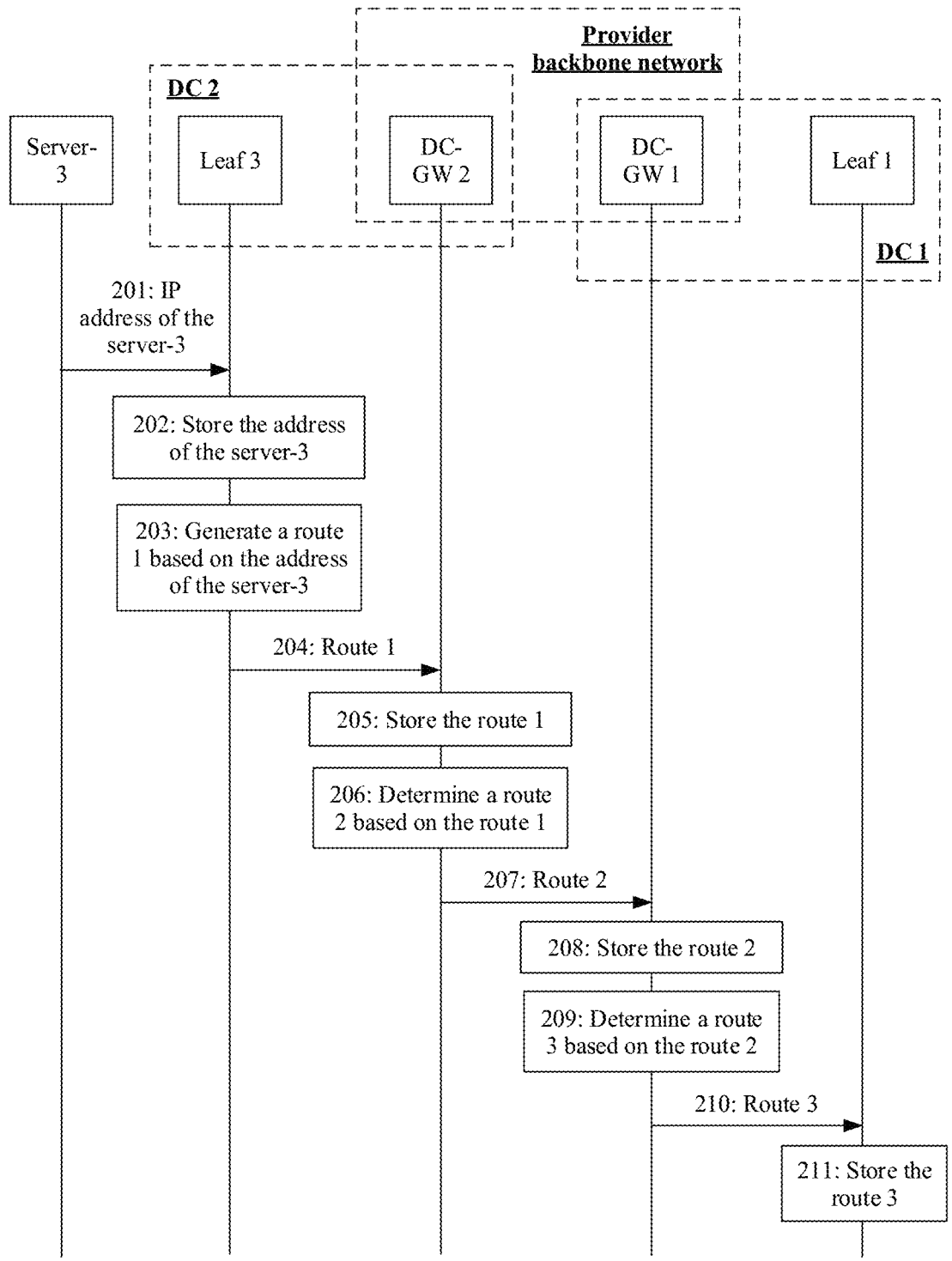
FIG. 2 is a signaling flowchart of a method for implementing multicast according to an embodiment of the present disclosure.

It should be noted that the embodiment shown in FIG. 4 may be performed before the embodiment shown in FIG. 2, or may be performed at the same time as the embodiment shown in FIG. 2. This is not limited herein.

In an embodiment, the tunnel established in the manner shown in FIG. 4 is a I-PMSI tunnel. To be specific, a tunnel that uses the edge device as the root node and that is to all other edge devices in the domain is established. In this case, the multicast traffic is multicast in the I-PMSI tunnel. When passing through an edge device, the multicast traffic uses the edge device as a root node based on a tunnel identifier indicated by a downstream interface in a multicast entry established on the edge device. The multicast traffic is sent to all edge devices (also referred to as leaf nodes) other than the root node in the domain. Among all the edge devices other than the root node, some edge devices are not connected downstream to multicast users and directly discard the received multicast traffic. Only an edge device that can reach a multicast user continues to forward the received multicast traffic. For example, when the multicast traffic of the multicast source server-3 reaches the DC-GW 2, the DC-GW 2 sends the multicast traffic to the DC-GW 1 and the PE 1. The DC-GW 1 forwards the multicast traffic to the multicast user host-1, and the PE 1 directly discards the multicast traffic. Therefore, network resources in the network may be wasted.

To save the network resources, this embodiment of the present disclosure further include: establishing, for an edge device (especially an edge device between a DC and the provider backbone network, for example, the DC-GW 2), a selective-provider multicast service interface (S-PMSI) tunnel, and generating, on a related edge device, a multicast entry corresponding to the S-PMSI tunnel. It may be understood that, the S-PMSI tunnel is an established tunnel from a root node to a leaf node, where only an edge device that has a downstream multicast user and that is in another edge device other than the root node in the domain is used as the leaf node.

The network shown in FIG. 1 is used as an example. It is assumed that the provider backbone network uses the I-PMSI tunnel. To be specific, when the multicast traffic sent by the server-3 passes through the DC-GW 2, the multicast traffic is forwarded, based on the generated multicast entry 3 on the DC-GW 2, to both the DC-GW 1 and the PE 1 at the same time. However, when the multicast traffic of the multicast source server-3 on the DC-GW 2 exceeds a traffic threshold, this embodiment of the present disclosure further provides a tunnel switching method. Specifically, the I-PMSI tunnel used in the provider backbone network may be switched to the S-PMSI tunnel. In an embodiment, a tunnel switching process may include two steps. Step 1: Establish the S-PMSI tunnel. Step 2: Update the multicast entry on the edge device.

In an embodiment, when the multicast traffic of the multicast source server-3 on the DC-GW 2 exceeds the traffic threshold, for step 1, the DC-GW 2 establishes an S-PMSI tunnel to the DC-GW 1, and a specific process may include: S11: the DC-GW 2 sends an intra-AS S-PMSI A-D route to the DC-GW 1, where the intra-AS S-PMSI A-D route includes path information of the to-be-established tunnel, and the path information includes an identifier of the to-be-established tunnel; S12: the DC-GW 1 sends an intra-AS S-PMSI A-D route to the DC-GW 2, where the intra-AS S-PMSI A-D route does not include the identifier of the to-be-established tunnel; S13a: the DC-GW 1 sends a mapping message to the DC-GW 2 along the transmission path, to establish the tunnel from the DC-GW 2 to the DC-GW 1; or S13b: the DC-GW 2 sends a path message to the DC-GW 1; and S14b: the DC-GW 1 sends a resv message to the DC-GW 2. For a specific process of establishing the tunnel, refer to related descriptions of establishing the tunnel from the DC-GW 2 to the DC-GW 1 in FIG. 4.

It may be understood that, after the S-PMSI tunnel from the DC-GW 2 to the DC-GW 1 is established through S11, S12, and S13a, or through S11, S12, S13b, and S14b, the identifier of the tunnel from the DC-GW 2 to the DC-GW 1 is inconsistent with the identifier of the I-PMSI tunnel from the DC-GW 2 to the DC-GW 1 established in the embodiment corresponding to FIG. 4. In this case, network resources are saved in a multicast process. In this embodiment of the present disclosure, a tunnel identifier of an I-PMSL tunnel in a related multicast table may be further replaced with a tunnel identifier of a corresponding S-PMSI tunnel. That is, for the second step, the network corresponding to FIG. 1 is used as an example. In the embodiment corresponding to FIG. 3A and FIG. 3B, the tunnel identifier of the I-PMSI tunnel, from the DC-GW 2 to the DC-GW 1, that is in the identifier of the upstream interface in the multicast entry 2 and that is in the identifier of the downstream interface in the multicast entry 3 may be updated to the tunnel identifier of the S-PMSI tunnel from the DC-GW 2 to the DC-GW 1. In this way, when the multicast traffic of the multicast source server-3 arrives at the DC-GW 2, the DC-GW 2 sends the multicast traffic only to the DC-GW 1. The DC-GW 1 forwards the multicast traffic to the multicast user host-1, but does not send the multicast traffic to the PE 1 that cannot reach the multicast user host-1. In this way, when multicast is performed based on the updated multicast entry in this embodiment, network resources can be saved.

Figure 5:
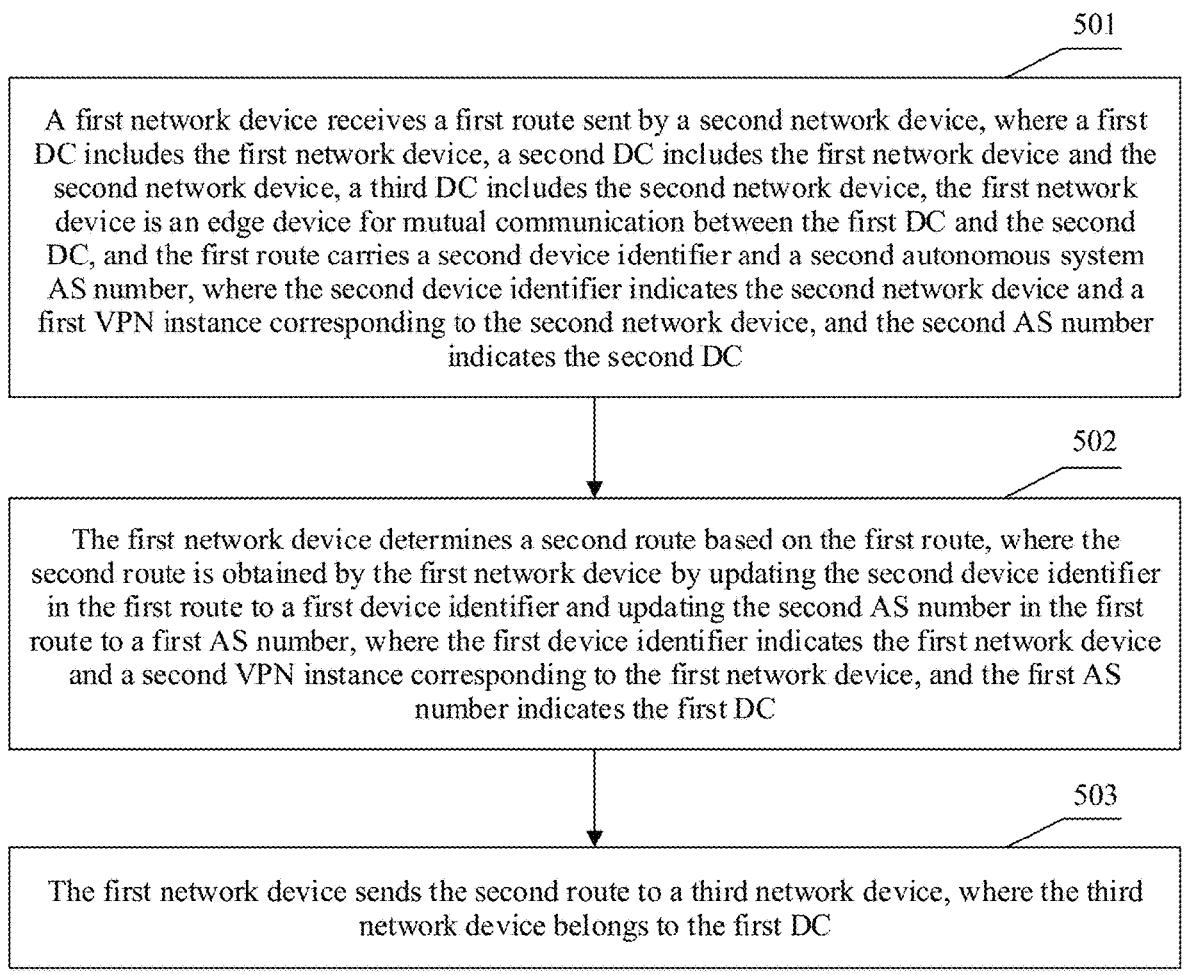
FIG. 5 is a flowchart of a method for implementing multicast according to an embodiment of the present disclosure.

FIG. 5 is a flowchart of a method for implementing multicast according to an embodiment of the present disclosure. Referring to FIG. 5, the method may include the following step 501 to step 503.

Step 501: A first network device receives a first route sent by a second network device, where a first DC includes the first network device, a second DC includes the first network device and the second network device, a third DC includes the second network device, the first network device is an edge device for mutual communication between the first DC and the second DC, and the first route carries a second device identifier and a second AS number, where the second device identifier indicates the second network device and a first VPN instance corresponding to the second network device, and the second AS number indicates the second DC.

The first route may include a second VRF route import extended community attribute and a second source AS extended community attribute. The second VRF route import extended community attribute includes the second device identifier, and the second source AS extended community attribute includes the second AS number.

The second DC and the third DC may belong to a same domain.

In a correspondence with the foregoing embodiment in which the network in FIG. 1 is used as a scenario, in a case, the first network device may be corresponding to the DC-GW 2, the second network device is the leaf 3, and the third network device may be the PE 1 or the DC-GW 1. In this case, the first DC is corresponding to the provider backbone network, and may belong to the AS domain corresponding to the AS number 100. The second DC is corresponding to the DC 2, and may belong to the AS domain whose AS number is 300. Both the third DC and the second DC may belong to the AS domain whose AS number is 300, or the third DC may be corresponding to an AS domain different from an AS domain of the second DC. The second device identifier is carried in the second VRF route import extended community attribute, and may be 5.5.5.5:123. The second AS number is carried in the second source AS extended community attribute, and may be 300. 5.5.5.5 in 5.5.5.5:123 is an identifier of the second network device leaf 3, and is used to indicate the leaf 3. 123 is the first VPN instance corresponding to the second network device leaf 3.

In a correspondence with the foregoing embodiment in which the network in FIG. 1 is used as a scenario, in another case, the first network device may be corresponding to the DC-GW 1, the second network device is the DC-GW 2 or the PE 1, and the third network device may be the leaf 1 or the leaf 2. In this case, the first DC is corresponding to the DC 1, and may belong to the AS domain corresponding to the AS number 200. The second DC is corresponding to the provider backbone network, and may belong to the AS domain whose AS number is 100. Both the third DC and the second DC may belong to the AS domain whose AS number is 100, or the third DC may be corresponding to the DC 2, and belong to the AS domain whose AS number is 300. If the second network device is the DC-GW 2, the second device identifier is carried in the second VRF route import extended community attribute, and may be 4.4.4.4:234. The second AS number is carried in the second source AS extended community attribute, and may be 100. 4.4.4.4 in 4.4.4.4:234 is an identifier of the second network device DC-GW 2, and is used to indicate the DC-GW 2. 234 is the first VPN instance corresponding to the second network device DC-GW 2.

It should be noted that, for related descriptions and implementations of step 501, refer to related descriptions of step 205 or step 208 in the embodiment corresponding to FIG. 2.

Step 502: The first network device determines a second route based on the first route, where the second route is obtained by the first network device by updating the second device identifier in the first route to a first device identifier and updating the second AS number in the first route to a first AS number, where the first device identifier indicates the first network device and a second VPN instance corresponding to the first network device, and the first AS number indicates the first DC.

The second route includes a first VRF route import extended community attribute and a first source AS extended community attribute, the first VRF route import extended community attribute includes the first device identifier, and the first source AS extended community attribute includes the first AS number.

The first route may be a BGP VPN route, and the second route may be a BGP EVPN route. Specifically, the second route may be an IP prefix route or a MAC/IP advertisement route of a BGP EVPN protocol, and the first route may be a BGP VPNv4 route.

In a correspondence with the foregoing embodiment in which the network in FIG. 1 is used as a scenario, if the first network device is corresponding to the DC-GW 2, the second network device is the leaf 3, and the third network device may be the PE 1 or the DC-GW 1. In this case, the first DC is corresponding to the provider backbone network, and may belong to the AS domain corresponding to the AS number 100. The first device identifier is carried in the first VRF route import extended community attribute, and may be 4.4.4.4:234. The first AS number is carried in the first source AS extended community attribute, and may be 100. 4.4.4.4 in 4.4.4.4:234 is an identifier of the first network device DC-GW 2, and is used to indicate the DC-GW 2. 234 is the second VPN instance corresponding to the second network device DC-GW 2.

In a correspondence with the foregoing embodiment in which the network in FIG. 1 is used as a scenario, if the first network device is corresponding to the DC-GW 1, the second network device is the DC-GW 2 or the PE 1, and the third network device may be the leaf 1 or the leaf 2. In this case, the first DC is corresponding to the DC 1, and may belong to the AS domain corresponding to the AS number 200. The first device identifier may be 1.1.1.1:567, and the first AS number may be 200. 1.1.1.1 in 1.1.1.1:567 is an identifier of the first network device DC-GW 1, and is used to indicate the DC-GW 1. 567 is the second VPN instance corresponding to the first network device DC-GW 1.

It should be noted that, for related descriptions and implementations of step 502, refer to related descriptions of step 206 or step 209 in the embodiment corresponding to FIG. 2.

Step 503: The first network device sends the second route to the third network device, where the third network device belongs to the first DC.

In a correspondence with the foregoing embodiment in which the network in FIG. 1 is used as a scenario, if the first network device is corresponding to the DC-GW 2, the second network device is the leaf 3, the third network device may be the PE 1 or the DC-GW 1, and the first DC is corresponding to the provider backbone network and may belong to the AS domain corresponding to the AS number 100. In this case, the DC-GW 2 sends the second route including a first device identifier 4.4.4.4:234 and a first AS number 100 to the PE 1 or the DC-GW 1.

In a correspondence with the foregoing embodiment in which the network in FIG. 1 is used as a scenario, if the first network device is corresponding to the DC-GW 1, the second network device is the DC-GW 2 or the PE 1, the third network device may be the leaf 1 or the leaf 2, and the first DC is corresponding to the DC 1 and may belong to the AS domain corresponding to the AS number 200. In this case, the DC-GW 1 sends the second route including a first device identifier 1.1.1.1:567 and a first AS number 200 to the leaf 1 or the leaf 2.

It should be noted that, for related descriptions and implementations of step 503, refer to related descriptions of step 207 or step 210 in the embodiment corresponding to FIG. 2.

In some implementations, in the method for implementing multicast provided in this embodiment of the present disclosure, before or in the process of performing step 501 to step 503, the method may further include a process of establishing a tunnel in each domain, including: S21: the first network device receives first path information sent by the second network device, and determines a first transmission path based on the first path information; and S22: the first network device sends second path information to the third network device, where the second path information is used to indicate the third network device to determine the second transmission path.

The first transmission path is a tunnel that is from the second network device to the first network device and that is established based on the first path information; and the second transmission path is a tunnel that is from the first network device to the third network device and that is established based on the second path information. The two tunnels may be I-PMSI tunnels.

In a correspondence with the foregoing embodiment in which the network in FIG. 1 is used as a scenario, when the first network device is corresponding to the DC-GW 2, the first transmission path may be the tunnel from the leaf 3 to the DC-GW 2, and the second transmission path may be the tunnel from the DC-GW 2 to the DC-GW 1. In this case, the first transmission path may be the PIM-SM tunnel of the VXLAN protocol, and the second transmission path may be the mLDP P2MP tunnel.

In a correspondence with the foregoing embodiment in which the network in FIG. 1 is used as a scenario, when the first network device is corresponding to the DC-GW 1, the first transmission path may be the tunnel from the DC-GW 2 to the DC-GW 1, and the second transmission path may be the tunnel from the DC-GW 1 to the leaf 1. In this case, the first transmission path may be the mLDP P2MP tunnel, and the second transmission path may be the PIM-SM tunnel of the VXLAN protocol.

It should be noted that, for related descriptions and implementations of S21 or S22, refer to related descriptions in the embodiment corresponding to FIG. 4, and the first transmission path and the second transmission path are established in the LDP or TE manner.

According to the foregoing method provided in this embodiment of the present disclosure, an upstream multicast source of the second network device completes route advertisement. If a downstream multicast user of the third network device joins the multicast source, the third network device in the network may trace to the first network device based on the received second route. Similarly, the first network device may trace to the second network device based on the received first route. In this way, a multicast path from the multicast source to the multicast user can be determined. Therefore, it is possible to accurately perform, in the NG MVPN, cross-DC multicast on traffic of the multicast source. In other words, when a multicast user and a multicast source that are not in a same DC and the multicast process passes through an integrated device of two DCs, the multicast service is provided for the multicast user.

Figure 6:
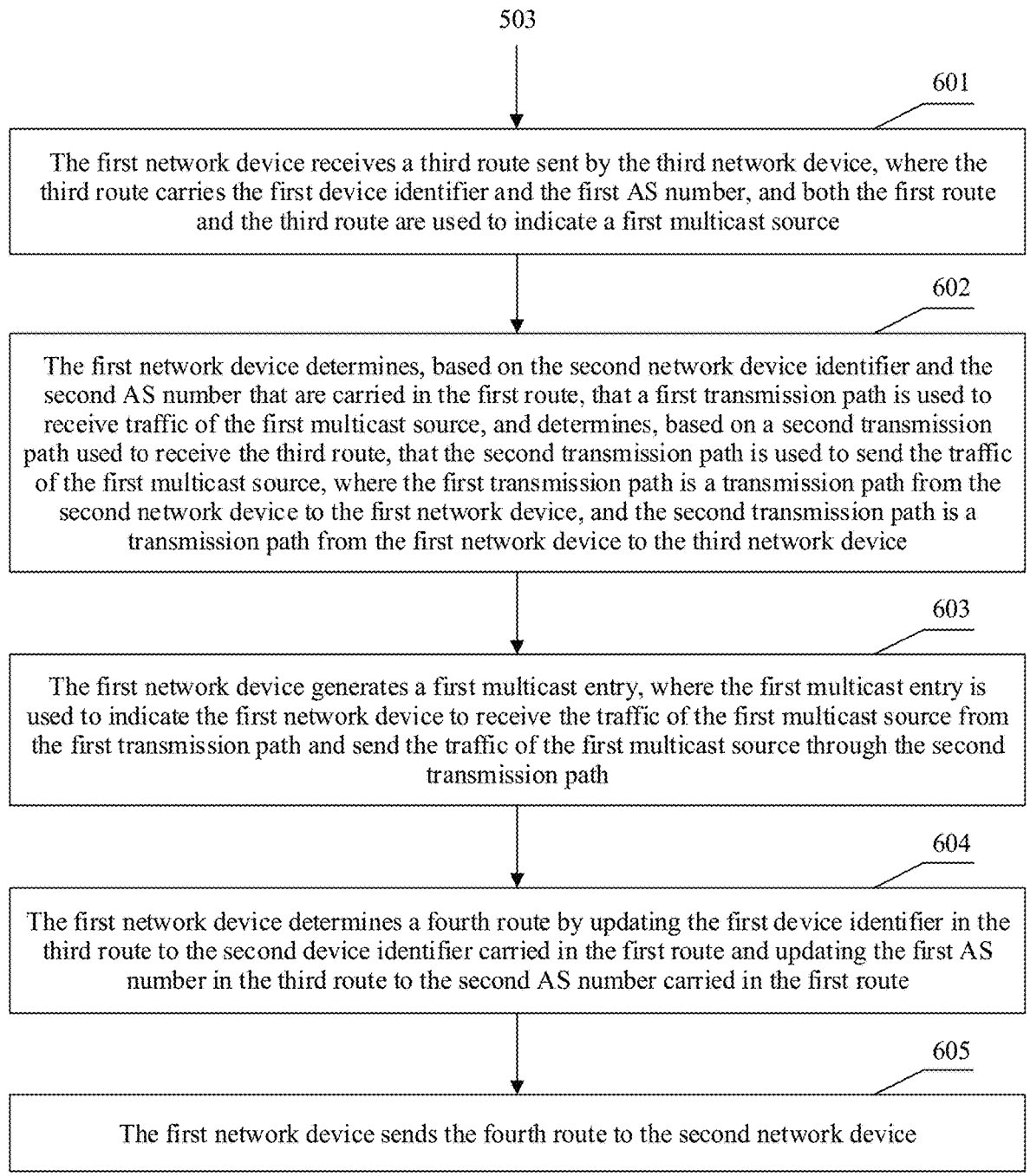
FIG. 6 is a flowchart of another method for implementing multicast according to an embodiment of the present disclosure.

FIG. 6 is a flowchart of another method for implementing multicast provided in an embodiment of the present disclosure. The method not only includes a process of advertising a private network route corresponding to FIG. 5, but also includes a process of requesting to access a multicast source by a multicast user and a process of creating a multicast entry for each network device. Referring to FIG. 6, after step 503, the method further includes the following step 601 to step 605.

Step 601: The first network device receives a third route sent by the third network device, where the third route carries the first device identifier and the first AS number, and both the first route and the third route are used to indicate a first multicast source.

It may be understood that the third route may be a BGP C-multicast route.

In a correspondence with the foregoing embodiment in which the network in FIG. 1 is used as a scenario, if the first network device is corresponding to the DC-GW 2, the second network device is the leaf 3, and the third network device may be the DC-GW 1. In this case, the third route may include the first device identifier 4.4.4.4:234 and the first AS number 100.

In a correspondence with the foregoing embodiment in which the network in FIG. 1 is used as a scenario, if the first network device is corresponding to the DC-GW 1, the second network device is the DC-GW 2 or the PE 1, and the third network device may be the leaf 1. In this case, the third route may include the first device identifier 1.1.1.1:567 and the first AS number 200.

It should be noted that, for related descriptions and implementations of step 601, refer to related descriptions of step 304 or step 307 in the embodiment corresponding to FIG. 2.

Step 602: The first network device determines, based on the second network device identifier and the second AS number that are carried in the first route, that the first transmission path is used to receive traffic of the first multicast source, and determines, based on the second transmission path used to receive the third route, that the second transmission path is used to send the traffic of the first multicast source, where the first transmission path is a transmission path from the second network device to the first network device, and the second transmission path is a transmission path from the first network device to the third network device.

Step 603: The first network device generates a first multicast entry, where the first multicast entry is used to indicate the first network device to receive the traffic of the first multicast source from the first transmission path and send the traffic of the first multicast source through the second transmission path.

It may be understood that both the first transmission path and the second transmission path may be I-PMSI tunnels.

In a correspondence with the foregoing embodiment in which the network in FIG. 1 is used as a scenario, if the first network device is corresponding to the DC-GW 2, the second network device is the leaf 3, the third network device may be the DC-GW 1, and the server-3 is corresponding to the first multicast source. In this case, the DC-GW 2 may determine, based on a second device identifier 5.5.5.5:123 and a second AS number 300 that are carried in the first route, that the first transmission path is the tunnel from the leaf 3 to the DC-GW 2, where the tunnel is used to receive the multicast traffic sent by the server-3. In addition, the DC-GW 2 may also determine, based on the tunnel that is from the DC-GW 2 to the DC-GW 1 and that is used to receive the third route, that the second transmission path is the tunnel from the DC-GW 2 to the DC-GW 1, where the tunnel is used to send the multicast traffic sent by the server-3. In this case, the DC-GW 2 may further create the first multicast entry, including an identifier of an upstream interface: the identifier of the tunnel from the leaf 3 to the DC-GW 2, and an identifier of a downstream interface: the identifier of the tunnel from the DC-GW 2 to the DC-GW 1.

In a correspondence with the foregoing embodiment in which the network in FIG. 1 is used as a scenario, if the first network device is corresponding to the DC-GW 1, the second network device is the DC-GW 2 or the PE 1, the third network device may be the leaf 1, and the server-3 is corresponding to the first multicast source. In this case, the DC-GW 1 may determine, based on a second device identifier 4.4.4.4:234 and a second AS number 100 that are carried in the first route, that the first transmission path is the tunnel from the DC-GW 2 to the DC-GW 1, where the tunnel is used to receive the multicast traffic sent by the server-3. In addition, the DC-GW 1 may also determine, based on the tunnel that is from the DC-GW 1 to the leaf 1 and that is used to receive the third route, that the second transmission path is the tunnel from the DC-GW 1 to the leaf 1, where the tunnel is used to send the multicast traffic sent by the server-3. In this case, the DC-GW 1 may further create the first multicast entry, including an identifier of an upstream interface: the identifier of the tunnel from the DC-GW 2 to the DC-GW 1, and an identifier of a downstream interface: the tunnel from the DC-GW 1 to the leaf 1.

It should be noted that, for related descriptions and implementations of step 602 and step 603, refer to related descriptions of step 305 and step 306 or step 308 and step 309 in the embodiment corresponding to FIG. 2.

Step 604: The first network device determines a fourth route by updating the first device identifier in the third route to the second device identifier carried in the first route and updating the first AS number in the third route to the second AS number carried in the first route.

Step 605: The first network device sends the fourth route to the second network device.

It may be understood that the fourth route may be a BGP C-multicast route.

It may be understood that the first network device may update the first device identifier and the first AS number that are carried in the third route, to obtain the fourth route. Specifically, the first device identifier is updated to the second device identifier, and the first AS number is updated to the second AS number. In other words, the fourth route includes the second device identifier, the second AS number, and other information in the third route other than the second device identifier and the second AS number.

In a correspondence with the foregoing embodiment in which the network in FIG. 1 is used as a scenario, if the first network device is corresponding to the DC-GW 2, the second network device is the leaf 3, and the third network device may be the DC-GW 1. In this case, the fourth route may include the second device identifier 5.5.5.5:123 and the second AS number 300. In addition, the DC-GW 2 sends the fourth route to the leaf 3, to notify the leaf 3 that a multicast user requests to join the multicast source and trigger the leaf 3 to create a corresponding multicast entry.

In a correspondence with the foregoing embodiment in which the network in FIG. 1 is used as a scenario, if the first network device is corresponding to the DC-GW 1, the second network device may be the DC-GW 2, and the third network device may be the leaf 1. In this case, the fourth route may include the second device identifier 4.4.4.4:234 and the second AS number 100. In addition, the DC-GW 1 sends the fourth route to the DC-GW 2, to notify the DC-GW 2 that the multicast user requests to join the multicast source and trigger the DC-GW 2 to create the corresponding multicast entry.

It should be noted that, for related descriptions and implementations of step 604 and step 605, refer to related descriptions of step 307 to step 310 in the embodiment corresponding to FIG. 2.

In some implementations, the first transmission path and the second transmission path are I-PMSI tunnels. In an embodiment, in a domain, a tunnel in which an integrated device is a root node and all other edge devices in the domain are leaf nodes is established, and the tunnel is corresponding to a tunnel identifier. When multicast traffic passes through the integrated device, the integrated device is used as a tunnel ingress node, and the multicast traffic is forwarded from the edge devices. However, only the multicast traffic received by a tunnel egress node of a multicast user accessed downstream is forwarded, and all the multicast traffic received by the other edge devices is discarded, which wastes network resources. Based on this, when the multicast traffic is of the first multicast source indicated by the first route and when the multicast traffic exceeds the traffic threshold on the second network device, an S-PMSI tunnel is established from the second network device to the first network device in this embodiment of the present disclosure, and a second multicast entry is generated on the first network device based on the newly established S-PMSI tunnel.

In an implementation, establishing the S-PMSI tunnel from the second network device to the first network device may include: S31: the first network device receives third path information sent by the second network device, and determines a third transmission path based on the third path information.

The third transmission path is a tunnel established from the second network device to the first network device based on the third path information, and the tunnel is the S-PMSI tunnel.

In a correspondence with the foregoing embodiment in which the network in FIG. 1 is used as a scenario, when the first network device is corresponding to the DC-GW 2, the third transmission path may be the tunnel from the leaf 3 to the DC-GW 2, and the second transmission path may be the tunnel from the DC-GW 2 to the DC-GW 1. In this case, the third transmission path may be the PIM-SM tunnel of the VXLAN protocol, and the second transmission path may be the mLDP P2MP tunnel.

In a correspondence with the foregoing embodiment in which the network in FIG. 1 is used as a scenario, when the first network device is corresponding to the DC-GW 1, the third transmission path may be the tunnel from the DC-GW 2 to the DC-GW 1, and the second transmission path may be the tunnel from the DC-GW 1 to the leaf 1. In this case, the third transmission path may be the mLDP P2MP tunnel, and the second transmission path may be the PIM-SM tunnel of the VXLAN protocol.

It should be noted that, for related descriptions and implementations of S31, refer to related descriptions of S11, S12, and S13a or S11, S12, S13b, and S14b or refer to related descriptions of the embodiment corresponding to FIG. 4.

In this way, in the domain, when the S-PMSI tunnel from the second network device to the first network device is established, only the tunnel from the second network device to the first network device is established, and a tunnel from the second network device to each of the other edge devices is not included.

In an implementation, generating the second multicast entry on the first network device based on the newly established S-PMSI tunnel may include: The first network device generates the second multicast entry. The second multicast entry is used to indicate the first network device to receive the traffic of the multicast source from the third transmission path and send the traffic of the multicast source through the second transmission path, and the third transmission path is the S-PMSI tunnel from the second network device to the first network device.

It may be understood that, because the third transmission path and the first transmission path are two different tunnels, the third transmission path and the first transmission path are corresponding to different tunnel identifiers. In this case, when the multicast traffic of the first multicast source indicated by the first route and when the multicast traffic exceeds the traffic threshold on the second network device, and the third transmission path is established, the first network device may generate the second multicast entry based on a change of the transmission path from the second network device to the first network device.

It should be noted that, for related descriptions and implementations of generating the second multicast entry, refer to related descriptions of step 306 or step 309 in the embodiment corresponding to FIG. 2.

In this way, when passing through the second network device, the multicast traffic is forwarded out of the first network device through only the third transmission path, and is not forwarded out of another edge device and then discarded. This improves utilization of network resources.

According to the foregoing method provided in this embodiment of the present disclosure, the routing information is updated when the route is advertised, and the multicast entry is created based on the updated routing information, to ensure that the multicast traffic sent from the multicast source can be accurately forwarded to the multicast user that has joined the multicast source. This ensures that the multicast service can be provided for the multicast user. In addition, a tunnel switching implementation is provided in the multicast process, to switch the intra-domain I-PMSI tunnel to the S-PMSI tunnel, thereby saving network resources.

Figure 7:
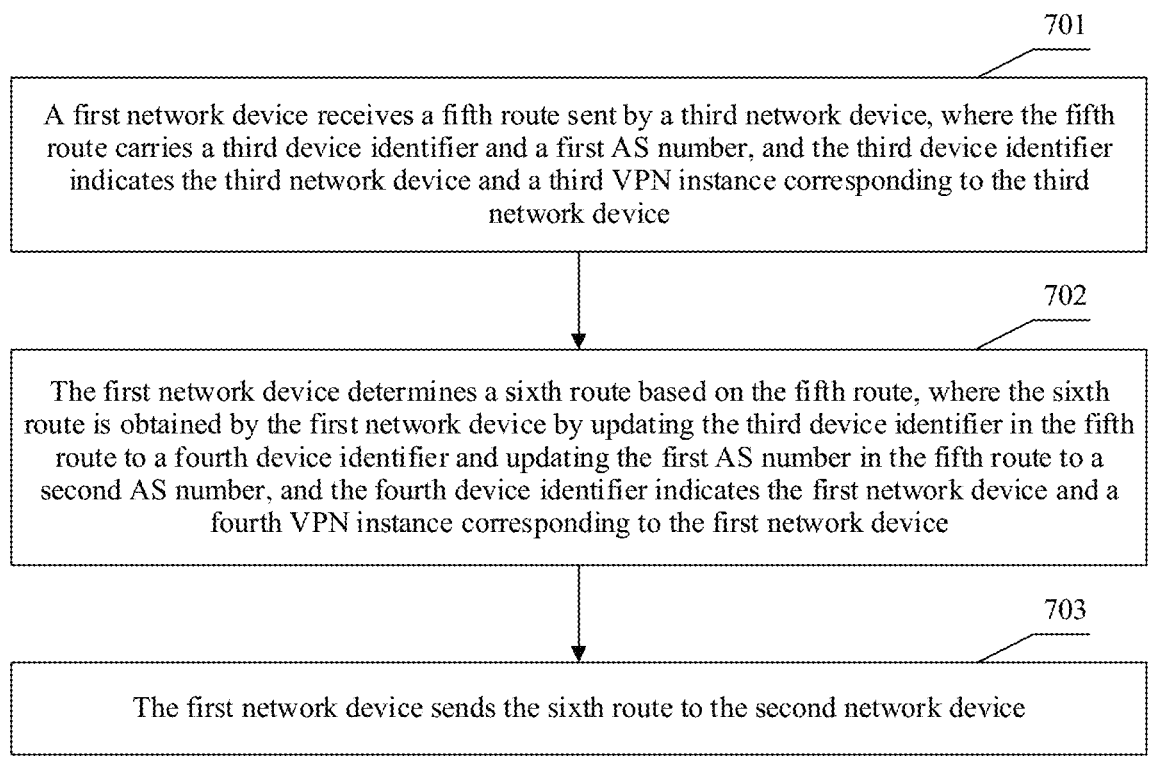
FIG. 7 is a flowchart of yet another method for implementing multicast according to an embodiment of the present disclosure.
Figure 8:
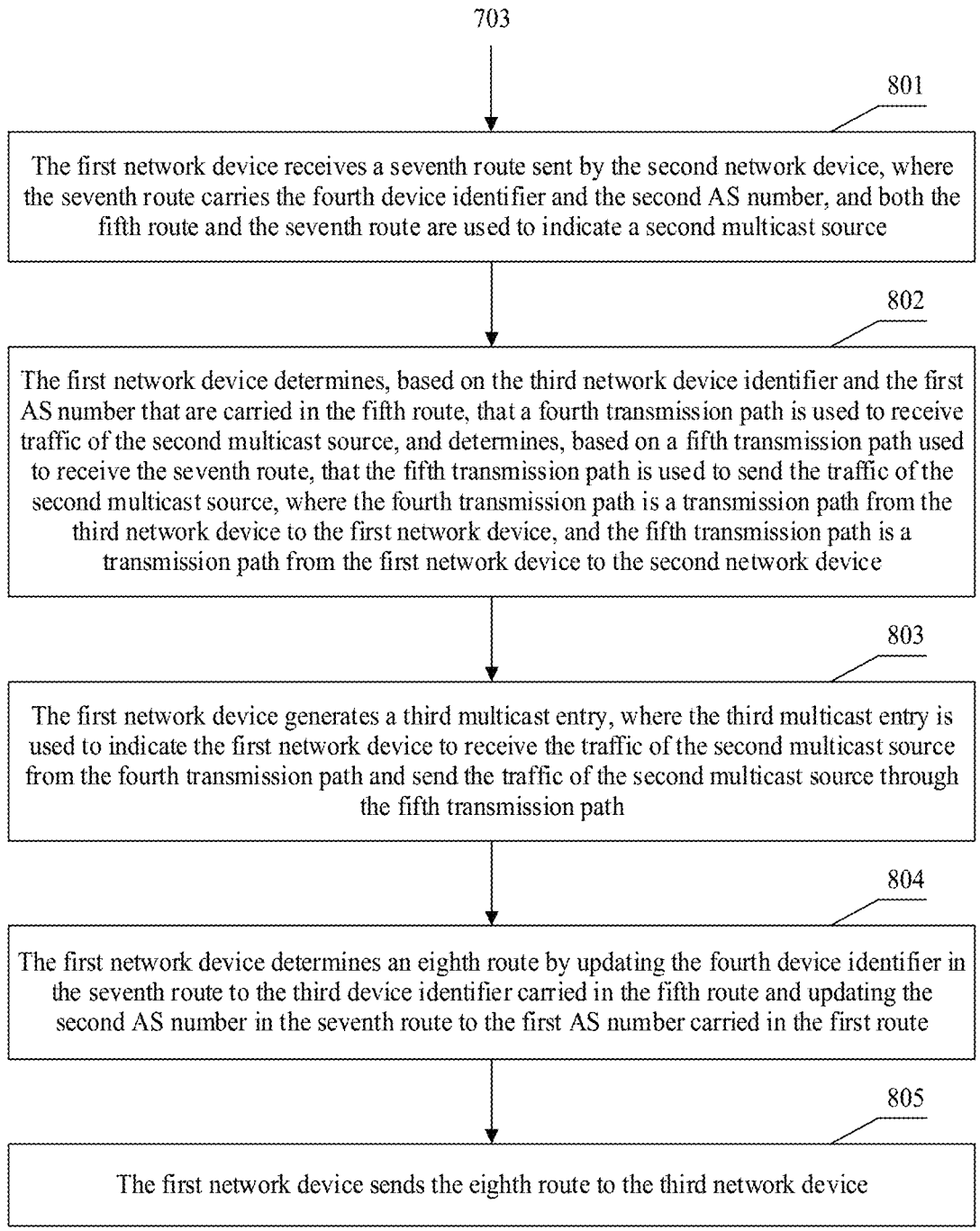
FIG. 8 is a flowchart of still another method for implementing multicast according to an embodiment of the present disclosure.

In all the foregoing embodiments, the method for implementing multicast provided in the embodiments of the present disclosure is described based on multicast source 4 second network device 4 first network device 4 third network device 4 network of a multicast user. In an embodiment, a third network device side (namely, the first DC) may also be connected to the multicast source, and a second network device side (namely, the third DC) may be connected to the multicast user, namely, multicast user 4 second network device 4 first network device 4 third network device 4 multicast source. With reference to FIG. 7 and FIG. 8, when the third network device side is connected to the multicast source and the second network device side is connected to the multicast user, the following describes the method for implementing multicast provided in the embodiments of the present disclosure.

In a first part, FIG. 7 is a flowchart of a method for implementing multicast according to an embodiment of the present disclosure. The method may include the following steps.

Step 701: The first network device receives a fifth route sent by the third network device, where the fifth route carries a third device identifier and the first AS number, and the third device identifier indicates the third network device and a third VPN instance corresponding to the third network device.

The fifth route includes a fifth VRF route import extended community attribute and a fifth source AS extended community attribute, the fifth VRF route import extended community attribute includes the third device identifier, and the fifth source AS extended community attribute includes the first AS number.

In the network shown in FIG. 1, in one case, if the multicast source is still the server-3 and the multicast user is the host-1, step 701 may be that the first network device DC-GW 2 receives the fifth route sent by the third network device leaf 3, where the fifth route includes a third device identifier 5.5.5.5:123 and a first AS number 300. Alternatively, step 701 may be that the first network device DC-GW 1 receives the fifth route sent by the third network device DC-GW 2, where the fifth route includes a third device identifier 4.4.4.4:234 and the first AS number 100. In another case, if the multicast source is the server-2 and the multicast user is the host-2, step 701 may be that the first network device DC-GW 1 receives the fifth route sent by the third network device leaf 2. Alternatively, step 701 may be that the first network device DC-GW 2 receives the fifth route sent by the third network device DC-GW 1.

It should be noted that, for related descriptions and implementations of step 701, refer to related descriptions of step 205 or step 208 in the embodiment corresponding to FIG. 2.

Step 702: The first network device determines a sixth route based on the fifth route, where the sixth route is obtained by the first network device by updating the third device identifier in the fifth route to a fourth device identifier and updating the first AS number in the fifth route to the second AS number, and the fourth device identifier indicates the first network device and a fourth VPN instance corresponding to the first network device.

The sixth route includes a sixth VRF route import extended community attribute and a sixth source AS extended community attribute, the sixth VRF route import extended community attribute includes the fourth device identifier, and the sixth source AS extended community attribute includes the second AS number.

The fifth route may be a BGP VPN route, and the sixth route may be a BGP EVPN route. Specifically, the fifth route may be an IP prefix route or a MAC/IP advertisement route of a BGP EVPN protocol, and the sixth route may be a BGP VPNv4 route.

In the network shown in FIG. 1, in one case, if the multicast source is still the server-3 and the multicast user is the host-1, step 702 may be that the first network device DC-GW 2 updates the third device identifier 5.5.5.5:123 in the fifth route to a fourth device identifier 4.4.4.4:234, and updates the first AS number 300 to the second AS number 100, to obtain the sixth route. Alternatively, step 702 may be that the first network device DC-GW 1 updates the third device identifier 4.4.4.4:234 in the fifth route to the fourth device identifier 1.1.1.1:567, and updates the first AS number 100 to a second AS number 200, to obtain the sixth route. In another case, if the multicast source is the server-2 and the multicast user is the host-2, step 702 may be that the first network device DC-GW 1 determines the sixth route based on the fifth route. Alternatively, step 702 may be that the first network device DC-GW 2 determines the sixth route based on the fifth route.

It should be noted that, for related descriptions and implementations of step 702, refer to related descriptions of step 206 or step 209 in the embodiment corresponding to FIG. 2.

Step 703: The first network device sends the sixth route to the second network device.

In the network shown in FIG. 1, in one case, if the multicast source is still the server-3 and the multicast user is the host-1, step 703 may be that the first network device DC-GW 2 sends the sixth route including the fourth device identifier 4.4.4.4:234 and the second AS number 100 to the second network device DC-GW 1. Alternatively, step 703 may be that the first network device DC-GW 1 sends the sixth route including the fourth device identifier 1.1.1.1:567 and the second AS number 200 to the second network device leaf 1. In another case, if the multicast source is the server-2 and the multicast user is the host-2, step 703 may be that the first network device DC-GW 1 sends the sixth route to the second network device DC-GW 2. Alternatively, step 703 may be that the first network device DC-GW 2 sends the sixth route to the second network device leaf 4.

It should be noted that, for related descriptions and implementations of step 703, refer to related descriptions of step 207 or step 210 in the embodiment corresponding to FIG. 2.

In some implementations, in the method for implementing multicast provided in this embodiment of the present disclosure, before or in the process of performing step 701 to step 703, the method may further include a process of establishing a tunnel in each domain, including: S41: the first network device receives fourth path information sent by the third network device, and determines a fourth transmission path based on the fourth path information; and S42: the first network device sends fifth path information to the second network device, where the fifth path information is used to indicate the second network device to determine a fifth transmission path.

The fourth transmission path is a tunnel that is from the third network device to the first network device and that is established based on the fourth path information; and the fifth transmission path is a tunnel that is from the first network device to the second network device and that is established based on the fifth path information. The two tunnels may be I-PMSI tunnels.

In the network shown in FIG. 1, in one case, if the multicast source is still the server-3, the multicast user is the host-1, and the first network device is the DC-GW 2, the fourth transmission path may be the tunnel from the leaf 3 to the DC-GW 2, and the fifth transmission path may be the tunnel from the DC-GW 2 to the DC-GW 1. Alternatively, when the first network device is the DC-GW 1, the fourth transmission path may be the tunnel from the DC-GW 2 to the DC-GW 1, and the fifth transmission path may be the tunnel from the DC-GW 1 to the leaf 1. In another case, if the multicast source is the server-2, the multicast user is the host-2, and the first network device is the DC-GW 1, the fourth transmission path may be the tunnel from the leaf 2 to the DC-GW 1, and the fifth transmission path may be the tunnel from the DC-GW 1 to the DC-GW 2. Alternatively, when the first network device is the DC-GW 2, the fourth transmission path may be the tunnel from the DC-GW 1 to the DC-GW 2, and the fifth transmission path may be a tunnel from the DC-GW 2 to the leaf 4.

It should be noted that, for related descriptions of S41 and S42, refer to related descriptions and implementations of S21 and S22. Alternatively, for related descriptions and implementations of S41 or S42, refer to related descriptions in the embodiment corresponding to FIG. 4. The fifth transmission path and the sixth transmission path are established in the LDP or TE manner.

In a second part, FIG. 8 is a flowchart of a method for implementing multicast according to an embodiment of the present disclosure. After step 703, the method further includes the following step 801 to step 805.

Step 801: The first network device receives a seventh route sent by the second network device, where the seventh route carries the fourth device identifier and the second AS number, and both the fifth route and the seventh route are used to indicate a second multicast source.

Step 802: The first network device determines, based on the third network device identifier and the first AS number that are carried in the fifth route, that the fourth transmission path is used to receive traffic of the second multicast source, and determines, based on the fifth transmission path used to receive the seventh route, that the fifth transmission path is used to send the traffic of the second multicast source, where the fourth transmission path is a transmission path from the third network device to the first network device, and the fifth transmission path is a transmission path from the first network device to the second network device.

Step 803: The first network device generates a third multicast entry, where the third multicast entry is used to indicate the first network device to receive the traffic of the second multicast source from the fourth transmission path and send the traffic of the second multicast source through the fifth transmission path.

Step 804: The first network device determines an eighth route by updating the fourth device identifier in the seventh route to the third device identifier carried in the fifth route and updating the second AS number in the seventh route to the first AS number carried in the first route.

Step 805: The first network device sends the eighth route to the third network device.

Both the seventh route and the eighth route may be BGP C-multicast routes.

Both the fourth transmission path and the fifth transmission path are I-PMSI tunnels.

It may be understood that, in the network shown in FIG. 1, in one case, the multicast source is still the server-3, and the multicast user is the host-1. The second network device corresponding to the first network device in step 601 to step 605 is used as the third network device corresponding to the first network device in step 801 to step 805. The third network device corresponding to the first network device in step 601 to step 605 is used as the second network device corresponding to the first network device in step 801 to step 805. In another case, the multicast source is the server-2, and the multicast user is the host-2. When the first network device is the DC-GW 1, the third network device may be the leaf 2, and the second network device may be the DC-GW 2. Alternatively, when the first network device is the DC-GW 2, the third network device may be the DC-GW 1, and the second network device may be the leaf 4.

It should be noted that, for related descriptions and implementations of step 801 to step 805, refer to related descriptions of step 601 to step 605 in the embodiment corresponding to FIG. 6.

In an example, when the multicast traffic is of the second multicast source indicated by the fifth route and when the multicast traffic exceeds the traffic threshold on the first network device, this embodiment of the present disclosure may further include: S51: the first network device sends sixth path information to the second network device, and determines a sixth transmission path based on the sixth path information. The sixth transmission path may be an S-PMSI tunnel. In this case, before multicast is implemented in this embodiment of the present disclosure, the method may further include: The first network device modifies the third multicast entry to a fourth multicast entry. The fourth multicast entry is used to indicate the first network device to send, through the sixth transmission path, the traffic received from the fourth transmission path, and the sixth transmission path is an S-PMSI tunnel from the first network device to the second network device.

It should be noted that, for related descriptions and implementations of S51, refer to related descriptions of S31, refer to related descriptions of S11, S12, and S13a, or refer to related descriptions of S11, S12, S13b, and S14b.

It should be noted that, for related descriptions and implementations of generating the fourth multicast entry, refer to related descriptions of generating the second multicast entry, or refer to related descriptions of step 306 or step 309 in the embodiment corresponding to FIG. 2.

In this way, when passing through the second network device, the multicast traffic is forwarded out of the first network device through only the sixth transmission path, and is not forwarded out of another edge device and then discarded. This improves utilization of network resources.

According to the foregoing method provided in this embodiment of the present disclosure, an upstream multicast source of the third network device completes route advertisement. If a downstream multicast user of the second network device joins the multicast source, the second network device in the network may trace to the first network device based on the received sixth route. Similarly, the first network device may trace to the third network device based on the received fifth route. In this way, a multicast path from the multicast source to the multicast user can be determined. Therefore, it is possible to accurately perform, in the NG MVPN, cross-DC multicast on traffic of the multicast source. In other words, when a multicast user and a multicast source that are not in a same DC and the multicast process passes through an integrated device of two DCs, the multicast service is provided for the multicast user.

Figure 9:
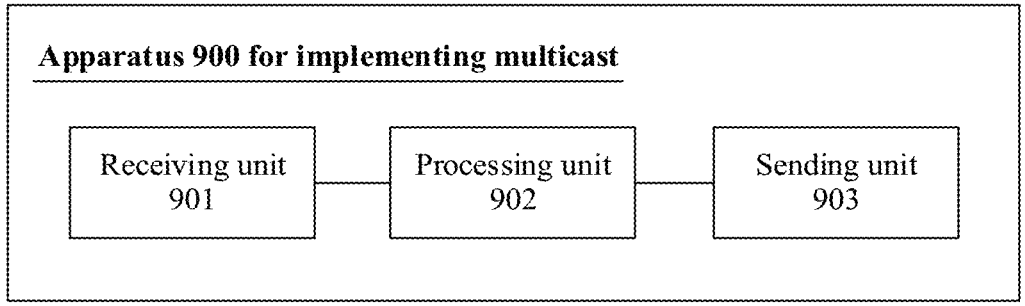
FIG. 9 is a schematic structural diagram of an apparatus for implementing multicast according to an embodiment of the present disclosure.

FIG. 9 is a schematic structural diagram of an apparatus 900 for implementing multicast according to an embodiment of the present disclosure. The apparatus 900 is applied to a first network device in a NG MVPN, and includes a receiving unit 901, a processing unit 902, and a sending unit 903.

The receiving unit 901 is configured to receive a first route sent by a second network device. A first DC includes the first network device, a second DC includes the first network device and the second network device, a third DC includes the second network device, the first network device is an edge device for mutual communication between the first DC and the second DC, and the first route carries a second device identifier and a second AS number. The second device identifier indicates the second network device and a first VPN instance corresponding to the second network device, and the second AS number indicates the second DC.

The processing unit 902 is configured to determine a second route based on the first route. The second route is obtained by the first network device by updating the second device identifier in the first route to a first device identifier and updating the second AS number in the first route to a first AS number. The first device identifier indicates the first network device and a second VPN instance corresponding to the first network device, and the first AS number indicates the first DC. The sending unit 903 is configured to send the second route to a third network device. The third network device belongs to the first DC.

It should be noted that the foregoing apparatus 900 for implementing multicast is configured to perform steps in the embodiment corresponding to FIG. 5. The receiving unit 901 may perform step 501, step 601, step 701, and step 801. The processing unit 902 may perform step 502, step 602 to step 604, step 702, and step 802 to step 804. The sending unit 903 may perform step 503, step 605, step 703, and step 805.

The first route includes a second VRF route import extended community attribute and a second source AS extended community attribute, the second VRF route import extended community attribute includes the second device identifier, and the second source AS extended community attribute includes the second AS number. The second route includes a first VRF route import extended community attribute and a first source AS extended community attribute, the first VRF route import extended community attribute includes the first device identifier, and the first source AS extended community attribute includes the first AS number.

It may be understood that the first route is a BGP VPN route, and the second route is a BGP EVPN route.

In an example, the second DC and the third DC belong to a same domain.

In a possible implementation, the receiving unit 901 in the apparatus 900 is further configured to: receive first path information sent by the second network device, and determine the first transmission path based on the first path information. The sending unit 903 is further configured to send second path information to the third network device, where the second path information is used to indicate the third network device to determine the second transmission path. Both the first transmission path and the second transmission path are I-PMSI tunnels.

In another possible implementation, the receiving unit 901 in the apparatus 900 is further configured to receive a third route sent by the third network device. The third route carries the first device identifier and the first AS number, and both the first route and the third route are used to indicate a first multicast source. The processing unit 902 is further configured to: determine, based on the second network device identifier and the second AS number that are carried in the first route, that the first transmission path is used to receive traffic of the first multicast source, and determine, based on the second transmission path used to receive the third route, that the second transmission path is used to send the traffic of the first multicast source; generate a first multicast entry; and determine a fourth route by updating the first device identifier in the third route to the second device identifier carried in the first route and updating the first AS number in the third route to the second AS number carried in the first route. The first transmission path is a transmission path from the second network device to the first network device, and the second transmission path is a transmission path from the first network device to the third network device. The first multicast entry is used to indicate the first network device to receive the traffic of the first multicast source from the first transmission path and send the traffic of the first multicast source through the second transmission path. The sending unit 903 is further configured to send the fourth route to the second network device. Both the third route and the fourth route are BGP C-multicast routes.

In yet another possible implementation, the processing unit 902 in the apparatus 900 is further configured to: generate a second multicast entry when multicast traffic is of the first multicast source indicated by the first route and when the multicast traffic exceeds a traffic threshold on the second network device. The second multicast entry is used to indicate the first network device to receive the traffic of the multicast source from a third transmission path and send the traffic of the multicast source through the second transmission path, and the third transmission path is a S-PMSI tunnel from the second network device to the first network device.

In still another possible implementation, the receiving unit 901 in the apparatus 900 is further configured to: receive third path information sent by the second network device, and determine the third transmission path based on the third path information.

In yet another possible implementation, the receiving unit 901 in the apparatus 900 is further configured to receive a fifth route sent by the third network device. The fifth route carries a third device identifier and the first AS number, and the third device identifier indicates the third network device and a third VPN instance corresponding to the third network device. The processing unit 902 is further configured to determine a sixth route based on the fifth route. The sixth route is obtained by the first network device by updating the third device identifier in the fifth route to a fourth device identifier and updating the first AS number in the fifth route to the second AS number, and the fourth device identifier indicates the first network device and a fourth VPN instance corresponding to the first network device. The sending unit 903 is further configured to send the sixth route to the second network device.

The fifth route includes a fifth VRF route import extended community attribute and a fifth source AS extended community attribute, the fifth VRF route import extended community attribute includes the third device identifier, and the fifth source AS extended community attribute includes the first AS number. The sixth route includes a sixth VRF route import extended community attribute and a sixth source AS extended community attribute, the sixth VRF route import extended community attribute includes the fourth device identifier, and the sixth source AS extended community attribute includes the second AS number.

It may be understood that the sixth route is a BGP EVPN route, and the fifth route is a BGP VPN route.

In still another possible implementation, the receiving unit 901 in the apparatus 900 is further configured to: receive fourth path information sent by the third network device, and determine the fourth transmission path based on the fourth path information. The sending unit 903 is further configured to send fifth path information to the second network device. The fifth path information is used to indicate the second network device to determine the fifth transmission path. Both the fourth transmission path and the fifth transmission path are I-PMSI tunnels.

In another possible implementation, the receiving unit 901 in the apparatus 900 is further configured to receive a seventh route sent by the second network device. The seventh route carries the fourth device identifier and the second AS number, and both the fifth route and the seventh route are used to indicate a second multicast source. The processing unit 902 is further configured to: determine, based on the third network device identifier and the first AS number that are carried in the fifth route, that the fourth transmission path is used to receive traffic of the second multicast source, and determine, based on the fifth transmission path used to receive the seventh route, that the fifth transmission path is used to send the traffic of the second multicast source; generate a third multicast entry; and determine an eighth route by updating the fourth device identifier in the seventh route to the third device identifier carried in the fifth route and updating the second AS number in the seventh route to the first AS number carried in the first route. The fourth transmission path is a transmission path from the third network device to the first network device, and the fifth transmission path is a transmission path from the first network device to the second network device. The third multicast entry is used to indicate the first network device to receive the traffic of the second multicast source from the fourth transmission path and send the traffic of the second multicast source through the fifth transmission path. The sending unit 903 is further configured to send the eighth route to the third network device. Both the seventh route and the eighth route are BGP C-multicast routes.

In yet another possible implementation, the processing unit 902 in the apparatus 900 is further configured to: modify the third multicast entry to a fourth multicast entry when multicast traffic is of the second multicast source indicated by the fifth route and when multicast traffic exceeds the traffic threshold on the first network device. The fourth multicast entry is used to indicate the first network device to send, through a sixth transmission path, the traffic received from the fourth transmission path, and the sixth transmission path is a -PMSI tunnel from the first network device to the second network device.

In still another possible implementation, the sending unit 903 in the apparatus 900 is further configured to: send sixth path information to the second network device, and determine the sixth transmission path based on the sixth path information.

It may be understood that the apparatus 900 is corresponding to the method provided in the method embodiment corresponding to FIG. 5. Therefore, for implementations of the apparatus 900 and technical effects achieved by the apparatus 900, refer to related descriptions of the implementations in the embodiment shown in FIG. 5.

Figure 10:
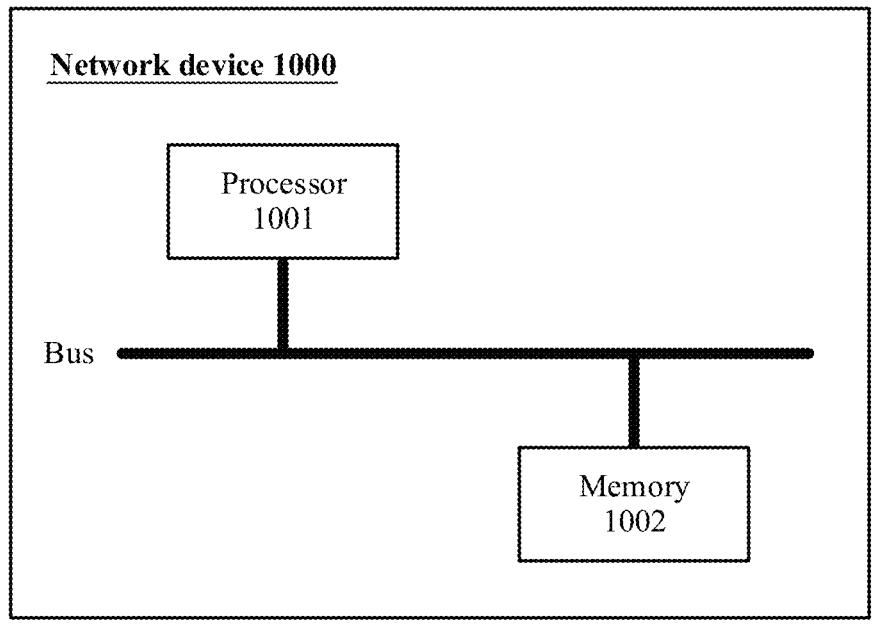
FIG. 10 is a schematic structural diagram of a network device according to an embodiment of the present disclosure.

In addition, FIG. 10 shows a network device 1000 according to an embodiment of the present disclosure. The network device 1000 includes a processor 1001 and a memory 1002. The memory 1002 stores instructions. When the processor 1001 executes the instructions, the network device 1000 is enabled to perform any implementation of the foregoing method for implementing multicast.

In addition, an embodiment of the present disclosure further provides a computer program product. When the computer program product is run on a computer, the computer is enabled to perform any implementation of the foregoing method for implementing multicast.

In addition, an embodiment of the present disclosure further provides a computer-readable storage medium. The computer-readable storage medium stores instructions. When the instructions are run on a computer or a processor, the computer or the processor is enabled to perform any implementation of the foregoing method for implementing multicast.

"First" in names such as "the first network device" and "the first route" mentioned in the embodiments of the present disclosure is merely used as a name identifier, and does not represent first in sequence. This rule is also applicable to "second" and the like.

From the foregoing descriptions of the implementation, a person skilled in the art may clearly understand that some or all steps of the methods in the embodiments may be implemented by software in addition to a universal hardware platform. Based on such an understanding, the technical solutions of the present disclosure may be implemented in a form of a software product. The computer software product may be stored in a storage medium, such as a read-only memory (ROM)/random access memory (RAM), a magnetic disk, or an optical disc, and includes several instructions for instructing a computer device (which may be a personal computer, a server, or a network communications device such as a router) to perform the method described in the embodiments or some parts of the embodiments of the present disclosure.

The embodiments in this specification are all described in a progressive manner, for same or similar parts in the embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment. The described apparatus embodiment is merely an example. The modules described as separate parts may or may not be physically separate, and parts displayed as modules may or may not be physical modules, may be located in one position, or may be distributed on a plurality of network units. Some or all the modules may be selected based on actual needs to achieve the objectives of the solutions of the embodiments. A person of ordinary skill in the art may understand and implement the embodiments without creative efforts.

The foregoing descriptions are merely example implementations of the present disclosure, but are not intended to limit the protection scope of the present disclosure.

What is claimed is:

1. A method for implementing multicast, implemented by a first network device in a next-generation multicast virtual private network (NG MVPN), and comprising:
receiving a first route from a second network device, wherein a first data center (DC) comprises the first network device, a second DC comprises the first network device and the second network device, a third DC comprises the second network device, and the first network device is an edge device for mutual communication between the first DC and the second DC, wherein the first route carries a second device identifier and a second autonomous system (AS) number, wherein the second device identifier indicates the second network device and a first virtual private network (VPN) instance corresponding to the second network device, and wherein the second AS number indicates the second DC;
determining a second route based on the first route by updating the second device identifier in the first route to a first device identifier and updating the second AS number in the first route to a first AS number, wherein the first device identifier indicates the first network device and a second VPN instance corresponding to the first network device, and wherein the first AS number indicates the first DC; and
sending the second route to a third network device, wherein the third network device belongs to the first DC.

2. The method according to claim 1, wherein the first route comprises a second virtual routing and forwarding (VRF) route import extended community attribute and a second source AS extended community attribute, wherein the second VRF route import extended community attribute comprises the second device identifier, and wherein the second source AS extended community attribute comprises the second AS number.

3. The method according to claim 1, wherein the second route comprises a first VRF route import extended community attribute and a first source AS extended community attribute, wherein the first VRF route import extended community attribute comprises the first device identifier, and wherein the first source AS extended community attribute comprises the first AS number.

4. The method according to claim 1, wherein the first route is a Border Gateway Protocol (BGP) VPN route, and wherein the second route is a BGP Ethernet VPN (EVPN) route.

5. The method according to claim 1, wherein the second DC and the third DC belong to a same domain.

6. The method according to claim 1, further comprising:
receiving first path information from the second network device;
determining a first transmission path based on the first path information; and
sending second path information to the third network device, wherein the second path information enables the third network device to determine a second transmission path.

7. The method according to claim 6, further comprising:
receiving a third route from the third network device, wherein the third route carries the first device identifier and the first AS number, and wherein both the first route and the third route indicate a first multicast source;
determining, based on the second network-device identifier and the second AS number that are carried in the first route, that the first transmission path is for receiving traffic of the first multicast source;
determining that the second transmission path is for sending the traffic of the first multicast source, wherein the first transmission path is from the second network device to the first network device, and wherein the second transmission path is from the first network device to the third network device;
generating a first multicast entry, wherein the first multicast entry instructs the first network device to receive the traffic of the first multicast source from the first transmission path and send the traffic of the first multicast source through the second transmission path;
determining a fourth route by updating the first device identifier in the third route to the second device identifier carried in the first route and updating the first AS number in the third route to the second AS number carried in the first route; and
sending the fourth route to the second network device.

8. The method according to claim 7, wherein both the third route and the fourth route are BGP customer multicast (BGP C-multicast) routes.

9. The method according to claim 7, wherein both the first transmission path and the second transmission path are inclusive-provider multicast service interface (I-PMSI) tunnels.

10. The method according to claim 9, further comprising generating, when multicast traffic that is of the first multicast source indicated by the first route and that is on the second network device exceeds a traffic threshold, a second multicast entry, wherein the second multicast entry instructs the first network device to receive the traffic of the first multicast source from a third transmission path and send the traffic of the first multicast source through the second transmission path, and wherein the third transmission path is a selective-provider multicast service interface (S-PMSI) tunnel from the second network device to the first network device.

11. The method according to claim 10, further comprising:
receiving third path information from the second network device; and
determining the third transmission path based on the third path information.

12. The method according to claim 1, further comprising:
receiving a fifth route from the third network device, wherein the fifth route carries a third device identifier and the first AS number, and wherein the third device identifier indicates the third network device and a third VPN instance corresponding to the third network device;
determining a sixth route based on the fifth route by updating the third device identifier in the fifth route to a fourth device identifier and updating the first AS number in the fifth route to the second AS number, wherein the fourth device identifier indicates the first network device and a fourth VPN instance corresponding to the first network device; and
sending the sixth route to the second network device.

13. The method according to claim 12, wherein the fifth route comprises a fifth VRF route import extended community attribute and a fifth source AS extended community attribute, wherein the fifth VRF route import extended community attribute comprises the third device identifier, and wherein the fifth source AS extended community attribute comprises the first AS number.

14. The method according to claim 12, wherein the sixth route comprises a sixth VRF route import extended community attribute and a sixth source AS extended community attribute, wherein the sixth VRF route import extended community attribute comprises the fourth device identifier, and wherein the sixth source AS extended community attribute comprises the second AS number.

15. A first network device for implementing multicast, wherein the first network device is in a next-generation multicast virtual private network (NG MVPN) and comprises:
a non-transitory memory configured to store instructions; and
a processor coupled to the non-transitory memory, wherein the instructions, when executed by the processor, cause the first network device to be configured to:
receive a first route from a second network device, wherein a first data center (DC) comprises the first network device, a second DC comprises the first network device and the second network device, a third DC comprises the second network device, the first network device is an edge device for mutual communication between the first DC and the second DC, and the first route carries a second device identifier and a second autonomous system (AS) number, wherein the second device identifier indicates the second network device and a first virtual private network (VPN) instance corresponding to the second network device, and the second AS number indicates the second DC;
determine a second route based on the first route, wherein the second route is obtained by the first network device by updating the second device identifier in the first route to a first device identifier and updating the second AS number in the first route to a first AS number, wherein the first device identifier indicates the first network device and a second VPN instance corresponding to the first network device, and the first AS number indicates the first DC; and
send the second route to a third network device, wherein the third network device belongs to the first DC.

16. The first network device according to claim 15, wherein the first route comprises a second virtual routing and forwarding (VRF) route import extended community attribute and a second source AS extended community attribute, the second VRF route import extended community attribute comprises the second device identifier, and the second source AS extended community attribute comprises the second AS number.

17. The first network device according to claim 15, wherein the second route comprises a first VRF route import extended community attribute and a first source AS extended community attribute, the first VRF route import extended community attribute comprises the first device identifier, and the first source AS extended community attribute comprises the first AS number.

18. The first network device according to claim 15, wherein the first route is a border gateway protocol (BGP) VPN route, and the second route is a BGP Ethernet VPN (EVPN) route.

19. The first network device according to claim 15, wherein the second DC and the third DC belong to a same domain.

20. The first network device according to claim 15, wherein the instructions, when executed by the processor, further cause the first network device apparatus to be configured to:
receive first path information from the second network device, and determine a first transmission path based on the first path information; and
send second path information to the third network device, wherein the second path information enables the third network device to determine a second transmission path.

* * * * *

UNITED STATES PATENT AND TRADEMARK OFFICE
CERTIFICATE OF CORRECTION

PATENT NO. : 12,063,153 B2
APPLICATION NO. : 17/541465
DATED : August 13, 2024
INVENTOR(S) : Guoqi Xu et al.

It is certified that error appears in the above-identified patent and that said Letters Patent is hereby corrected as shown below:

In the Claims

Column 36, Line 46, Claim 20 "first network device apparatus to be" should read "first device to be"

Signed and Sealed this
First Day of October, 2024

Katherine Kelly Vidal
*Director of the United States Patent and Trademark Office*